US008095099B2

(12) United States Patent
Patel et al.

(10) Patent No.: US 8,095,099 B2
(45) Date of Patent: Jan. 10, 2012

(54) MULTIPLE RADIO RECEIVE CHAIN WIRELESS COMMUNICATION DEVICES

(76) Inventors: Bhaskar Patel, San Clemente, CA (US); Arumugam Govindswamy, Irvine, CA (US); Sarath Babu Govindarajulu, Irvine, CA (US)

( * ) Notice: Subject to any disclaimer, the term of this patent is extended or adjusted under 35 U.S.C. 154(b) by 974 days.

(21) Appl. No.: 12/074,919

(22) Filed: Mar. 7, 2008

(65) Prior Publication Data
US 2008/0220807 A1    Sep. 11, 2008

Related U.S. Application Data

(60) Provisional application No. 60/905,853, filed on Mar. 9, 2007.

(51) Int. Cl.
*H04B 1/18* (2006.01)
(52) U.S. Cl. ......... 455/183.1; 455/76; 455/78; 455/524; 455/67.11; 455/560
(58) Field of Classification Search ............... 455/183.1, 455/76.78, 524, 67.11, 39, 179.1, 500, 560, 455/160.1, 165.1, 132–133, 140, 146, 150.1, 455/88, 73, 63.3, 62
See application file for complete search history.

(56) References Cited

U.S. PATENT DOCUMENTS

| 5,475,677 | A  | * | 12/1995 | Arnold et al. ................. 370/280 |
| 5,758,266 | A  | * | 5/1998 | Kornfeld et al. ................. 455/86 |
| 5,809,423 | A  |  | 9/1998 | Benveniste |
| 6,028,850 | A  | * | 2/2000 | Kang ........................... 370/320 |
| 6,188,900 | B1 | * | 2/2001 | Ruiz et al. ...................... 455/436 |
| 7,020,102 | B2 | * | 3/2006 | Tuomainen et al. .......... 370/311 |
| 2003/0058786 | A1 | * | 3/2003 | Sato et al. ..................... 370/203 |
| 2003/0223480 | A1 | * | 12/2003 | Cafarella ....................... 375/219 |
| 2009/0227220 | A1 |  | 9/2009 | Ishida et al. |
| 2010/0110988 | A1 |  | 5/2010 | Marinier et al. |

OTHER PUBLICATIONS

Fa Foster Dai et al., "MIMO RFIC Transceiver Designs for WLAN Applications", ASIC, 2007. 7$^{th}$ International Conference on ASIC Proceedings. © 2007 IEEE. pp. 348-351.
David G. Rah, et al., "A Fully integrated Multiband MIMO WLAN Transceiver RFIC", IEEE Journal of Solid-State Circuits, vol. 40, No. 8, Aug. 2005, 0018-9200, © 2005 IEEE, pp. 1629-1641.
John W. M. Rogers et al., "A Multiband of ΔΣ Fractional-$N$ Frequency Synthesizer for a MIMO WLAN Transceiver RFIC" IEEE Journal of Solid-State Circuits, vol. 40, No. 3, Mar. 2005, 0018-9200, © 2005 IEEE, pp. 678-689.
Diego Piazza et al., "Random Beamforming for Spatial Multiplexing in Downlink Multiuser MIMO Systems", 2005 IEEE 16th International Symposium on Personal, Indoor and Mobile Radio Communications, 978-3-8007-2909-8/05, © 2005 IEEE, pp. 2161-2165.

* cited by examiner

*Primary Examiner* — Edward Urban
*Assistant Examiner* — Ganiyu Hanidu
(74) *Attorney, Agent, or Firm* — Lerner, David, Littenberg, Krumholz & Mentlik, LLP

(57) ABSTRACT

The present invention provides architectures and methods which use multiple radio receive chains in mobile devices to boost performance of the mobile devices. While a first set of the receive chains are assigned to a serving base station, another set of receive chains are dynamically allocated to neighbor base stations and/or to the serving base station depending upon present or expected system conditions and timing. A first synthesizer is configured to provide signals to the first and second set of receive chains. Other synthesizers are also configured to provide signals to the second set of receive chains. Thus, depending on the mode of operation, the second set of receive chains utilizes signals from a given synthesizer as needed. A priori data may be used to allocate specific receive chains to the serving base station, neighboring base stations or both. Unused synthesizers may be turned off to conserve power.

12 Claims, 19 Drawing Sheets

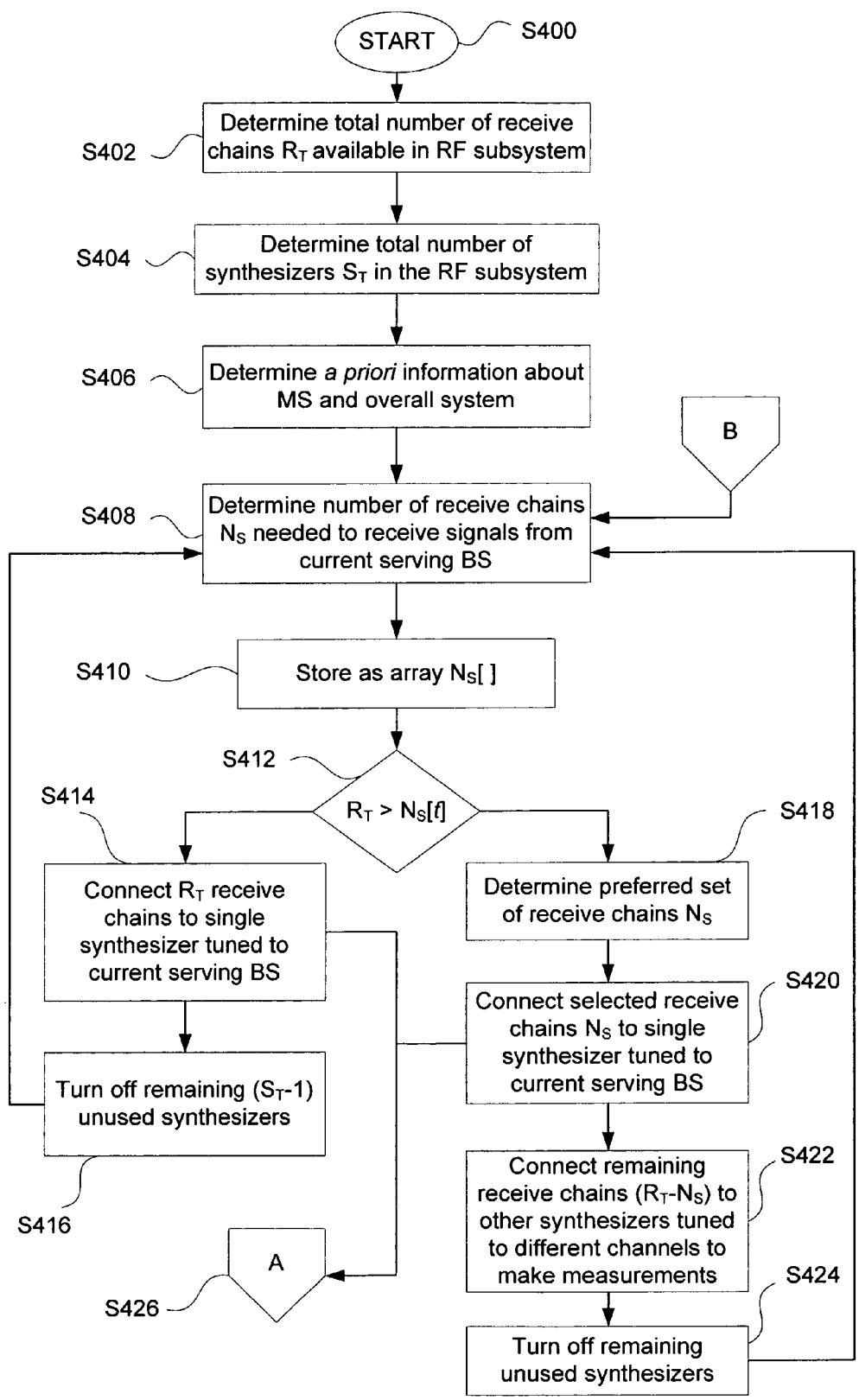

MULTIPLE RADIO RECEIVE CHAIN WIRELESS COMMUNICATION DEVICES

CROSS-REFERENCE TO RELATED APPLICATION

This application claims the benefit of U.S. Provisional Patent Application No. 60/905,853, filed Mar. 9, 2007 and entitled "Innovative Use of Receive Radio Chains in MIMO Mobile Wireless Communication Systems," the entire disclosure of which is hereby expressly incorporated by reference herein.

BACKGROUND OF THE INVENTION

The present invention relates generally to wireless communication systems and, more particularly, to mobile station receiver architectures and methods that employ multiple radio receive chains.

As shown in FIG. 1, a wireless communication system 10 comprises elements such as a client terminal or mobile station 12 and base stations 14. Other network devices which may be employed, such as a mobile switching center, are not shown. As illustrated, the communication path from the base station ("BS") to the client terminal direction is referred to herein as the downlink ("DL") and the communication path from the client terminal to the base station direction is referred to herein as the uplink ("UL"). In some wireless communication systems the client terminal or mobile station ("MS") communicates with the BS in both DL and UL directions. For instance, this is the case in cellular telephone systems. In other wireless communication systems the client terminal communicates with the base stations in only one direction, usually the DL. This may occur in applications such as paging.

Many wireless communication systems use large number of channels over different frequencies. Each base station in these systems use one or more of the available channels. Therefore the client terminals need to make periodic measurements to choose the best channel for communication. The base station to which the client terminal is communicating with is referred as the serving base station. In some wireless communication systems the serving base station is normally referred as the serving cell. While in practice a cell may include one or more base stations, a distinction is not made between a base station and a cell, and such terms may be used interchangeably herein. The base stations that are in the vicinity of the serving base station are called neighbor base stations. Similarly, in some wireless communication systems a neighbor base station is normally referred as a neighbor cell. For these wireless communication systems the client terminals or MSs are required to make periodic measurements on other channels belong to serving or neighbor base stations. These measurements may include parameters such as signal strength. To make such measurements the client terminal may need to tune to other channels in the communication system.

A discussion of the fundamentals of cellular systems may be found in the text entitled "Mobile Cellular Telecommunications Systems" by William C. Y. Lee, copyright 1989 and published by McGraw-Hill Book Company, the entire disclosure of which is hereby expressly incorporated by reference herein. Another text that details aspects of cellular communication systems is "Wireless and Personal Communications Systems" by Garg and Wilkes, copyright 1996 and published by Prentice Hall PTR, the entire disclosure of which is hereby expressly incorporated by reference herein.

As shown in FIG. 2, client terminal/MS 12 typically includes a baseband subsystem 16 and a radio frequency ("RF") subsystem 18. Memory 20, such as an external memory, is shown connected to the baseband subsystem 16. The baseband subsystem 16 normally consists of a micro controller unit ("MCU") 22, a signal processing unit ("SPU") 24, data converters 26, peripherals 28, power management 30, and memory 32 as shown in FIG. 3. The SPU 24 may be a digital signal processor ("DSP"), hardware ("SPU") accelerators, co-processors or a combination of the above. Normally the overall control of the baseband subsystem 16 is performed by software running on the MCU 22 and the processing of signals is done by the SPU 24.

Analog to digital converters ("ADCs") convert a received analog signal into digital for the baseband system to process it. Similarly, digital to analog converters ("DACs") convert the processed baseband digital signal into analog for transmission. The ADCs and DACs are collectively referred to herein as "data converters" 26. The data converters 26 can either be part of the baseband subsystem 16 or the RF subsystem 18. Depending on the location of the data converters 26, the interface between the two subsystems will be different. The location of the data converters 26 does not alter the overall function of the client terminal.

An RF subsystem 18 normally consists of a receiver, a transmitter, a synthesizer, a power amplifier, an antenna, and other components. An RF subsystem 18 for a time division duplex ("TDD") system is shown in FIG. 4. Receiver section 34 performs the task of converting the signal from RF to baseband. It includes mixers 36, filters 38, low noise amplifiers ("LNAs") 40 and variable gain amplifiers ("VGAs") 42. Transmitter section 44 performs the task of converting the baseband signal up to the RF. It includes mixers 46, filters 48, and gain control through VGAs 50. Power amplification of the transmit signal is typically done by a separate power amplifier ("PA") unit 52 but is considered part of the transmit RF chain. In some architectures, some of the components of the receiver and transmitter can be shared. As shown, the receiver section 34 and the transmitter section 44 are coupled to an antenna 54 via a transmit/receive switch 56. Synthesizer 58 is also shown as coupling to the receiver section 34 and the transmitter section 44.

Down conversion in the receiver 34 and up conversion in the transmitter 44 can be done in a single stage or multiple stages which lead to different implementations of RF subsystems. One possible implementation is direction conversion or zero intermediate frequency ("IF") where the downlink RF signal is converted to baseband by a single mixer and local oscillator ("LO"). Another implementation employs a super-heterodyne structure which uses one or more IF stages and LOs during the process of converting the RF signal to baseband. Yet another implementation uses an approach called "low IF" that converts the analog RF signal to a low intermediate frequency and then convert the analog intermediate frequency to a digital signal using high speed data converters.

The synthesizer 58 produces the LO frequency needed by the receiver 34 and the transmitter 44 to convert the signal from RF to baseband and to convert from baseband to RF respectively. A frequency synthesizer is an electronic system for generating a range of frequencies from a single fixed reference frequency. Synthesizer 58 normally consists of a phase-frequency discriminator, a charge pump, a loop filter, a voltage controlled oscillator ("VCO") and a frequency divider. One input to the synthesizer is a reference clock frequency and the other input is the desired frequency at the output of the VCO. The desired frequency is converted into an appropriate value for the frequency divider such that the VCO produces the desired frequency.

Typically the process of generating the LO frequency for receiving from or transmitting on a particular RF channel is referred to as "tuning to a channel." The mixers take the LO frequency generated by the synthesizer and multiply the desired signal. The output of the mixer can be filtered appropriately depending on whether down conversion (in receivers) or up conversion (transmitter) is desired.

Often, multiple receive and transmit chains are used in wireless communication systems to improve performance. The performance improvement can be in terms of better coverage, higher data rates, multiplexing of multiple users on the same channel at the same time, or some combination of the above. FIG. 5 illustrates an RF subsystem 60 with two RF receive chains.

As shown, RF subsystem 60 includes a transmitter 62, a synthesizer 64, and a pair of receivers $66_1$ and $66_2$. One of the receivers, $66_1$, and the transmitter 62 are coupled to a first antenna $68_1$ via transmit/receive switch 70. The other receiver, $66_2$, is connected to a second antenna $68_2$. Different techniques using multiple receive and/or transmit chains are often referred to with different names such as diversity combining (maximum ratio combining, equal gain combining, selection combining, etc.), space-time coding or space-time block coding, and multiple input multiple output ("MIMO").

In a traditional receiver with multiple chains, whenever the multiple receive chains are used they are all tuned to the same channel.

For instance, conventional multiple receive chain systems may employ multiple antennae and multiple RF chains as shown in FIG. 6. As shown, system 76 includes multiple receive chains $78_1$, $78_2$, ..., $78_N$. Each receive chain 78 is coupled to a respective antenna $80_1$, $80_2$, ..., $80_N$. Synthesizer 82, which is fed by a reference oscillator 83, couples to each of the receive chains 78 and to baseband processor 84. The synthesizer 82 provides a local oscillator signal LO to the receive chains 78. And the baseband processor 84 includes respective in-phase and quadrature ("I/Q") ADCs $86_1$, $86_2$, ..., $86_N$ that couple to respective ones of the receive chains 78.

In multiple receive chain systems, typically the antennae are designed to cover the entire frequency band of operation. However, the RF signal chains are tuned to a particular channel in the frequency band of operation. Commonly in a multiple receive chain MIMO configuration all RF signal chains are tuned to the same exact synthesizer frequency. The signals in all RF chains are different because of different positions of the various antennae $80_1$, $80_2$, ..., $80_N$.

In mobile communication systems, the MS typically communicates with one cell, normally referred to as serving cell. To facilitate mobility while maintaining continuous link with the serving cell in the network, the MS must periodically find, receive, update, and manage information about neighbor cells by performing signal measurements on them.

In order to obtain neighbor cell reception in some situations, the MS either has to switch between serving cell and neighbor cell or have additional dedicated RF signal chains that can be tuned to a different channel for neighbor cell reception as shown in FIG. 7. As shown here in system 76', an additional RF receive chain 88 having an antenna 89 is employed for a neighbor cell. Receive chain 88 couples to a respective I/Q ADC 90 in the baseband processor 84. Furthermore, an additional synthesizer 92 receives input from reference oscillator 94 and the baseband processor 84 and provides a LO signal to the RF receive chain 88.

Unfortunately, existing wireless systems implementing multiple receive chains have various drawbacks and disadvantages. For instance, switching between a serving cell and a neighbor cell may result in performance degradation. And employing additional dedicated RF chains for neighbor cell reception leads to additional cost and space requirements in the MS. Thus, there is a need for improved architectures that efficiently employ multiple receive chains.

SUMMARY OF THE INVENTION

In accordance with an embodiment of the present invention, a wireless mobile station is provided. The mobile station comprises a baseband subsystem and a radio frequency subsystem. The baseband subsystem includes a controller and a signal processing unit operatively connected to the controller. The radio frequency subsystem is operatively connected to the baseband subsystem. The radio frequency subsystem includes a transmitter, a plurality of synthesizers and a plurality of radio frequency receive chains. The transmitter is operable to obtain transmit signals from the baseband subsystem, process the transmit signals and to send out the processed transmit signals from the wireless mobile station. A first one of the plurality of synthesizers is operable to generate a first local oscillating signal and a second one of the plurality of synthesizers is operable to generate a second local oscillating signal. The plurality of radio frequency receive chains is operable to receive signals from at least one base station, to process the received signals and to send the processed received signals to the baseband subsystem. A first one of the plurality of radio frequency receive chains receives the first local oscillating signal from the first synthesizer in a first mode of operation. The first radio frequency receive chain receives the second local oscillating signal from the second synthesizer in a second mode of operation. And a second one of the plurality of radio frequency receive chains receives the first local oscillating signal from the first synthesizer in both the first and second modes of operation.

In one alternative, the wireless mobile station further comprises a switch mechanism coupling the first and second synthesizers to the first receive chain. Here, the switch mechanism switches between the first and second local oscillating signals based upon a switching signal from the controller.

In one example the transmitter receives the first local oscillating signal from the first synthesizer in both the first and second modes of operation. In another example a third one of the plurality of synthesizers is operable to generate a third local oscillating signal and the transmitter receives the third local oscillating signal from the third synthesizer in both the first and second modes of operation.

In a further alternative, in the first mode of operation both the first and second receive chains are tuned to a serving base station while in the second mode of operation the first receive chain is tuned to a neighbor base station and the second receive chain remains tuned to the serving base station. In this case, in the first mode of operation the second synthesizer may be disabled.

In accordance with another embodiment of the present invention, a transceiver subsystem is provided for use in a wireless mobile station. The transceiver subsystem comprises a transmitter, a plurality of synthesizers and a plurality of receive chains. The transmitter is operable to process input signals and to send out the processed input signals from the wireless mobile station. A first one of the plurality of synthesizers is operable to generate a first local oscillating signal in response to a first synthesizer control signal. A second one of the plurality of synthesizers is operable to generate a second local oscillating signal in response to a second synthesizer control signal. The plurality of receive chains is operable to receive signals from at least one of a serving base station and a plurality of neighbor base stations, to process the received signals and to output the processed received signals. A first subset of the plurality of receive chains receives the first local oscillating signal from the first synthesizer in both a first mode of operation and a second mode of operation. A second subset of the plurality of receive chains receives the first local oscillating signal from the first synthesizer in the first mode of operation. The second subset of receive chains receives a local oscillating signal from another one of the plurality of synthesizers in the second mode of operation.

In one alternative, the first subset of receive chains is dedicated to receiving the signals from the serving base station in both the first and second modes of operation. Here, the second subset of receive chains advantageously receives the signals from the serving base station in the first mode of operation and receives the signals from at least one of the neighbor base stations in the second mode of operation.

In another alternative, the first mode of operation is a multiple input multiple output mode of operation and the second mode of operation is a non-multiple input multiple output mode of operation.

In a further alternative, the plurality of synthesizers includes a third synthesizer operable to generate a third local oscillating signal in response to a third synthesizer control signal. In this case, the second subset of receive chains preferably includes a first receiver and a second receiver. The first receiver receives the second local oscillating signal from the second synthesizer in the second mode of operation. The second receiver receives the third local oscillating signal from the third synthesizer in the second mode of operation. In one example, the first and second receivers of the second subset of receive chains are dynamically allocated to tune to different ones of the neighbor base stations in the second mode of operation.

In accordance with a further embodiment of the present invention, a method of allocating receive chains among base stations in a wireless network is provided. The method comprises determining a total number of receive chains $R_T$ available in a receiver subsystem of a wireless communication device; determining a total number of synthesizers $S_T$ in the receiver subsystem; determining a number of receive chains $N_S$, out of the total number of receive chains $R_T$, that are needed to receive a signal from a currently serving base station; and comparing $R_T$ against $N_S$. In performing the comparison, if $R_T$ is not greater than $N_S$, then tuning the $R_T$ receive chains to a channel of the currently serving base station. And if $R_T$ is greater than $N_S$, then the method operates by identifying, from the total number of receive chains $R_T$, which receive chains $N_S$ are to process signals from the currently serving base station; tuning the receive chains $N_S$ to the channel of the currently serving base station; and tuning a remaining number of the total number of receive chains $R_T$ to different channels to make measurements of signals of at least some of the other base stations.

In one alternative, the method further comprises determining a priori information about the wireless network. Here, identifying the receive chains $N_S$ to process the signals from the currently serving base station is desirably based upon the a priori information. The a priori information preferably includes at least one of signal to noise ratio and carrier to interference and noise ratio for each of the total number of receive chains $R_T$.

In another alternative, if $R_T$ is not greater than $N_S$, then the method further includes turning off any synthesizers not tuned to the channel of the currently serving base station. However, if $R_T$ is greater than $N_S$, then the method further comprises turning off any unused synthesizers out of the total number of synthesizers $S_T$.

In a further alternative, determining the number of receive chains $N_S$ that are needed to receive the signal from the currently serving base station is based on at least one of a signal condition, a broadcast message received by the wireless communication device and a unicast control message received by the wireless communication device.

In yet another alternative, determining the number of receive chains $N_S$ that are needed to receive the signal from the currently serving base station is performed repeatedly in multiple decision periods over a given unit of time. In this case, values determined in each decision period are preferably stored together as an array.

In a further example, a given receive chain is tuned to the channel of the currently serving base station or to one of the different channels by operatively coupling the given receive chain to a corresponding synthesizer and selecting an appropriate frequency of interest of the corresponding synthesizer. Here, the frequency of interest is advantageously selectable.

In accordance with another embodiment of the present invention, a wireless communication network comprises a plurality of base stations and a mobile station. The plurality of base stations is arranged in a cellular configuration. The mobile station includes a baseband subsystem and a radio frequency subsystem. The baseband subsystem includes a controller and a signal processing unit operatively connected to the controller. The radio frequency subsystem is operatively connected to the baseband subsystem. The radio frequency subsystem includes a transmitter, a plurality of synthesizers and a plurality of radio frequency receive chains. The transmitter is operable to obtain transmit signals from the baseband subsystem, process the transmit signals and to send out the processed transmit signals from the wireless mobile station. A first one of the plurality of synthesizers is operable to generate a first local oscillating signal and a second one of the plurality of synthesizers is operable to generate a second local oscillating signal. The plurality of radio frequency receive chains are operable to receive signals from at least one of the plurality of base stations, to process the received signals and to send the processed received signals to the baseband subsystem. A first one of the plurality of radio frequency receive chains receives the first local oscillating signal from the first synthesizer in a first mode of operation to tune to a serving base station. The first radio frequency receive chain receives the second local oscillating signal from the second synthesizer in a second mode of operation to tune to a neighbor base station. A second one of the plurality of radio frequency receive chains receives the first local oscillating signal from the first synthesizer in both the first and second modes of operation to tune to the serving base station. Advantageously, there is no transmission gap from the serving base station during the second mode of operation.

BRIEF DESCRIPTION OF THE DRAWINGS

FIGS. 11A-B illustrate flow diagrams of dynamic receive chain allocation and processing in accordance with aspects of the present invention.

DETAILED DESCRIPTION

Figure 1:
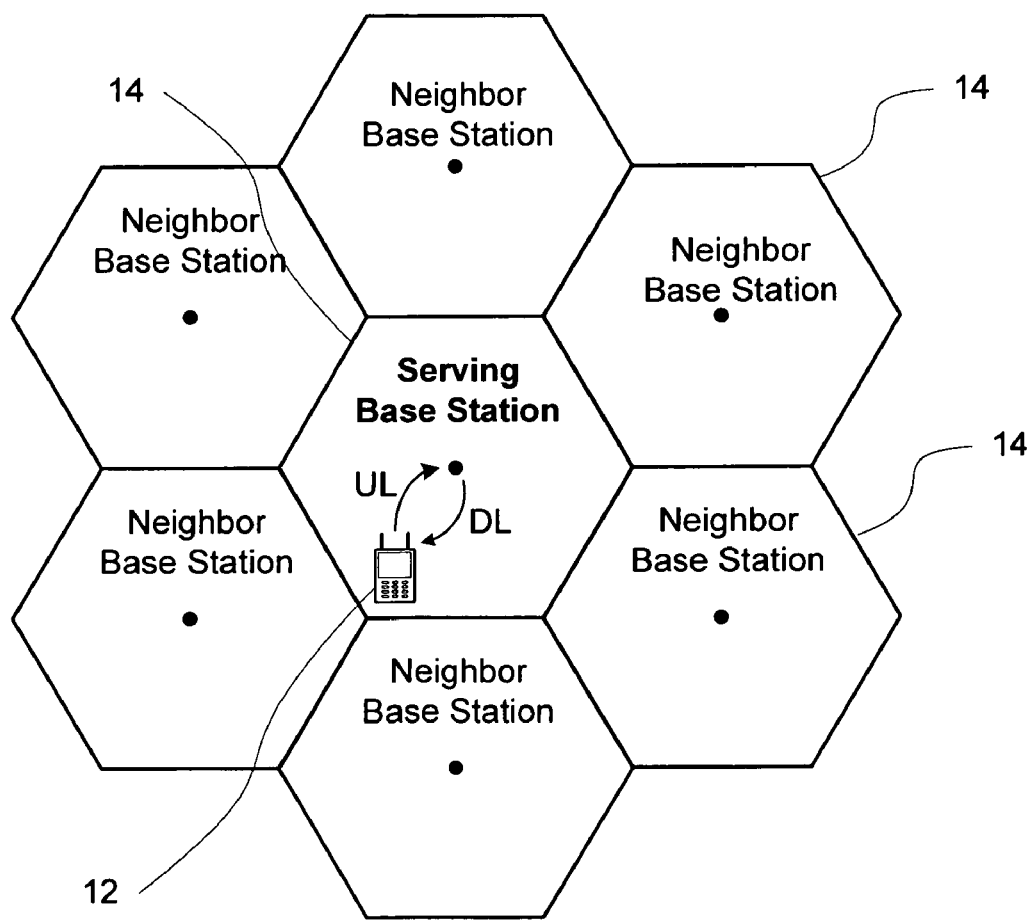
FIG. 1 illustrates a conventional wireless cellular communication system.
Figure 2:
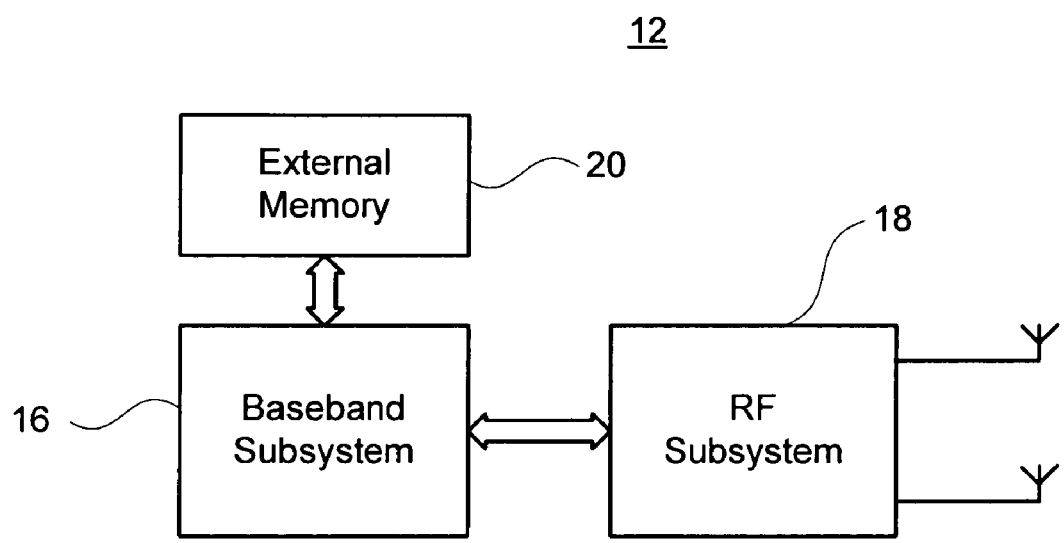
FIG. 2 illustrates a wireless mobile station diagram.
Figure 3:
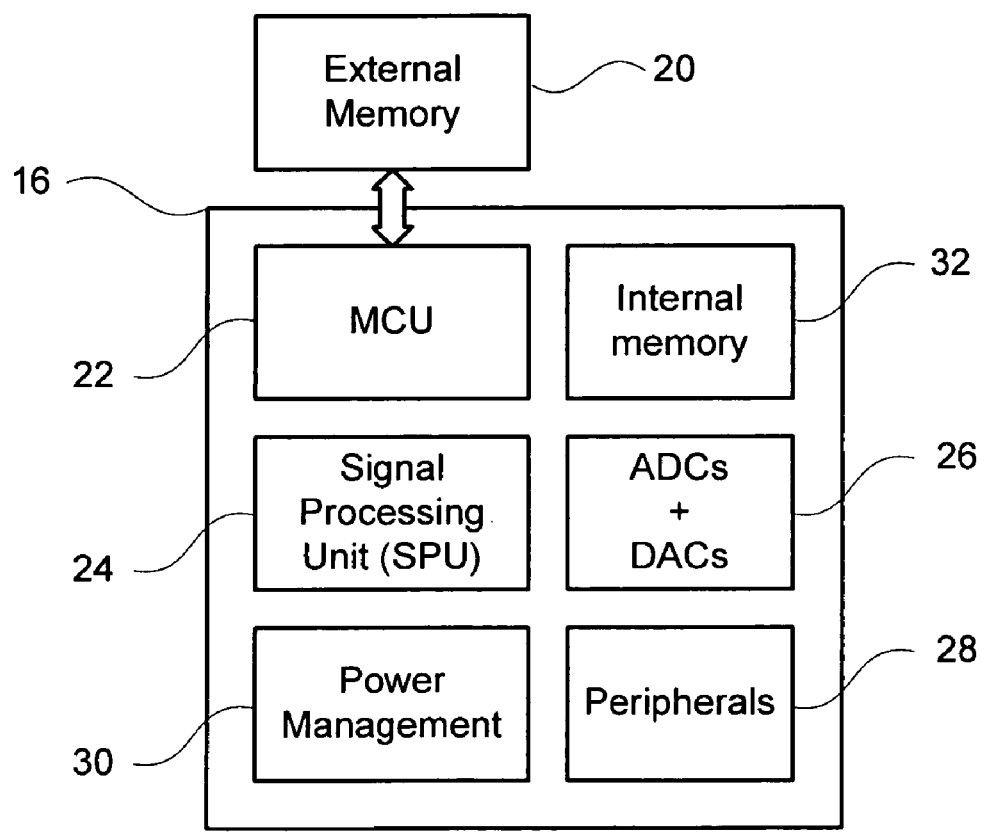
FIG. 3 illustrates a baseband subsystem for a wireless mobile station.
Figure 4:
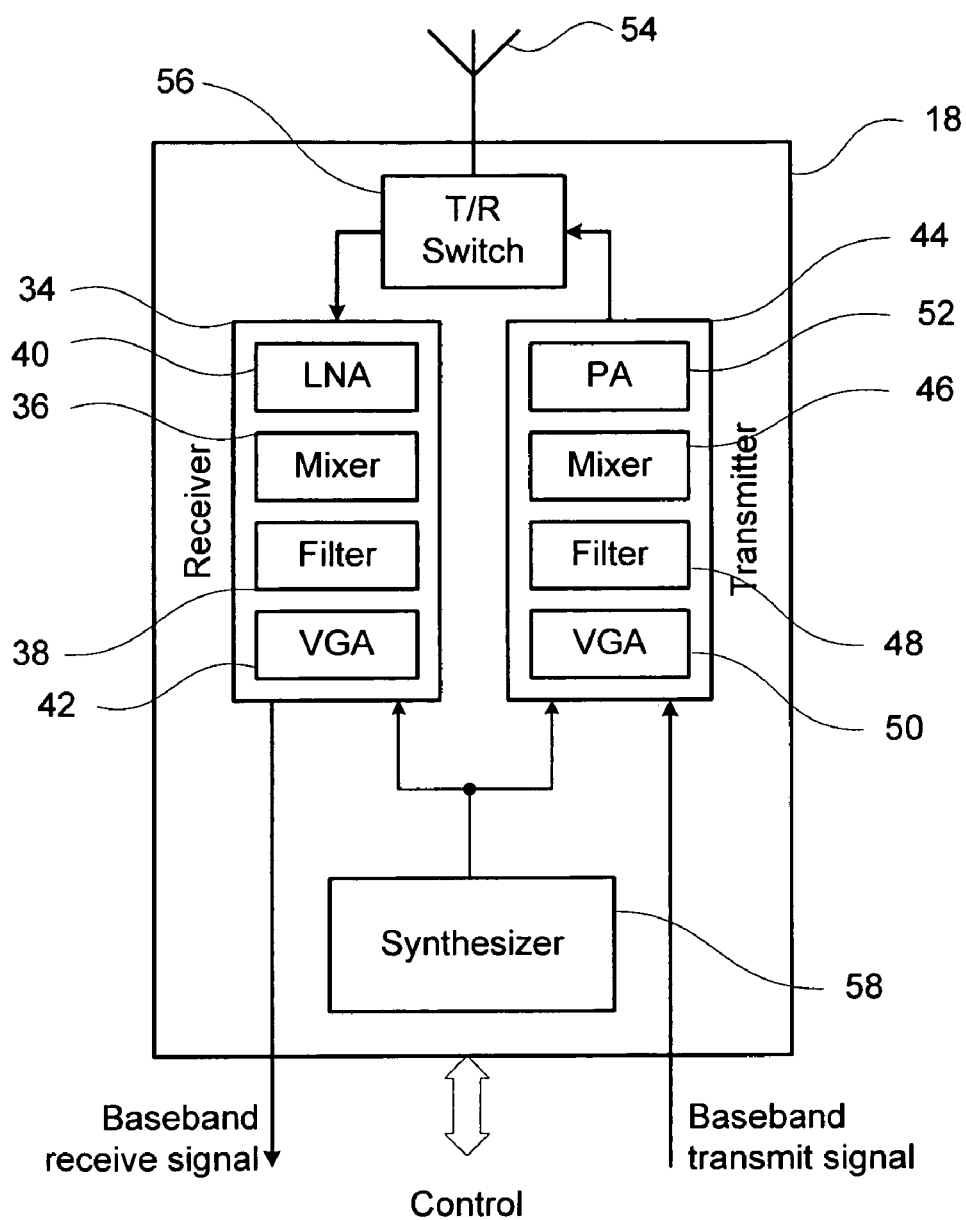
FIG. 4 illustrates an RF subsystem for a wireless mobile station.
Figure 5:
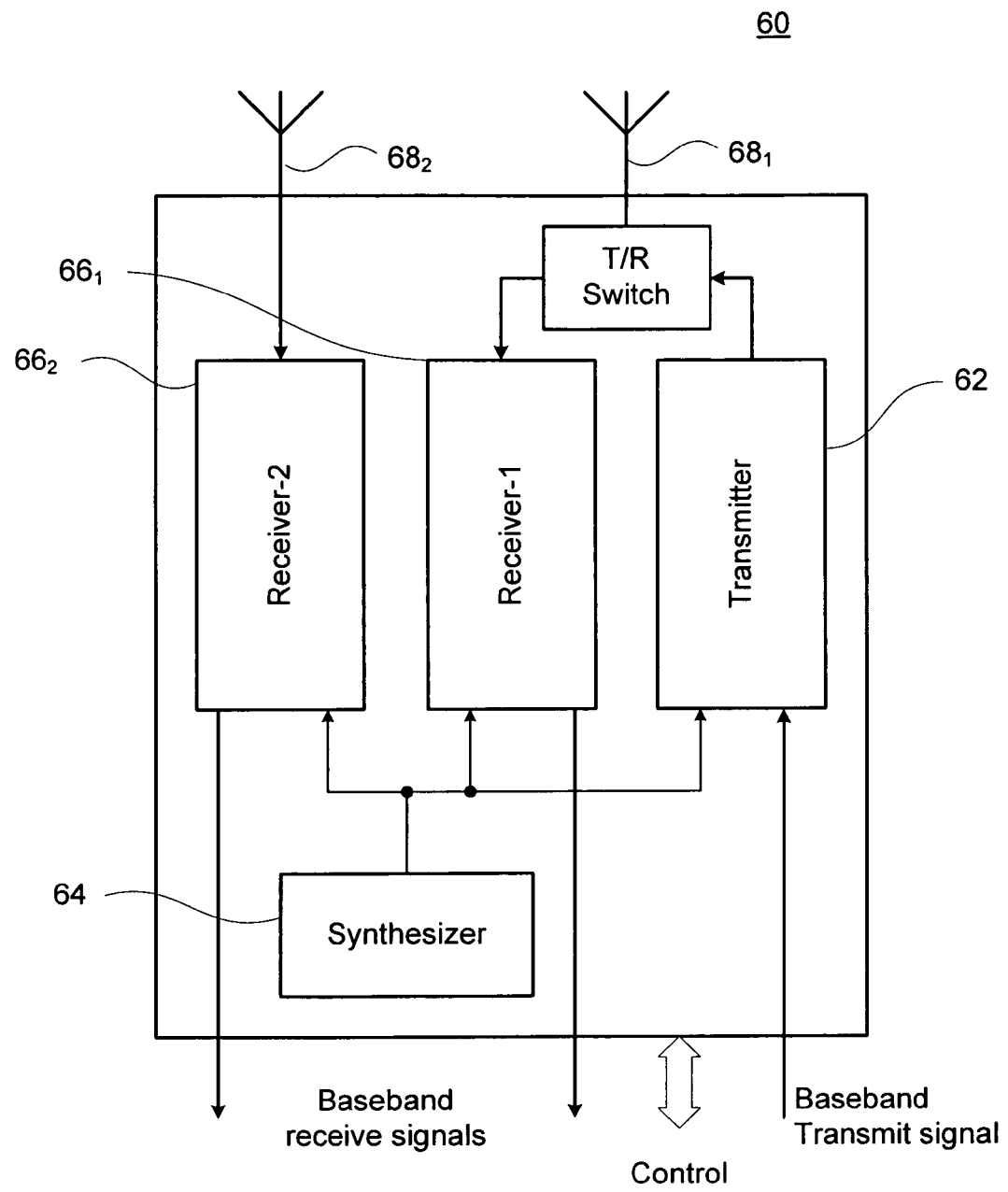
FIG. 5 illustrates an RF subsystem for a wireless mobile station having two receive chains.
Figure 6:
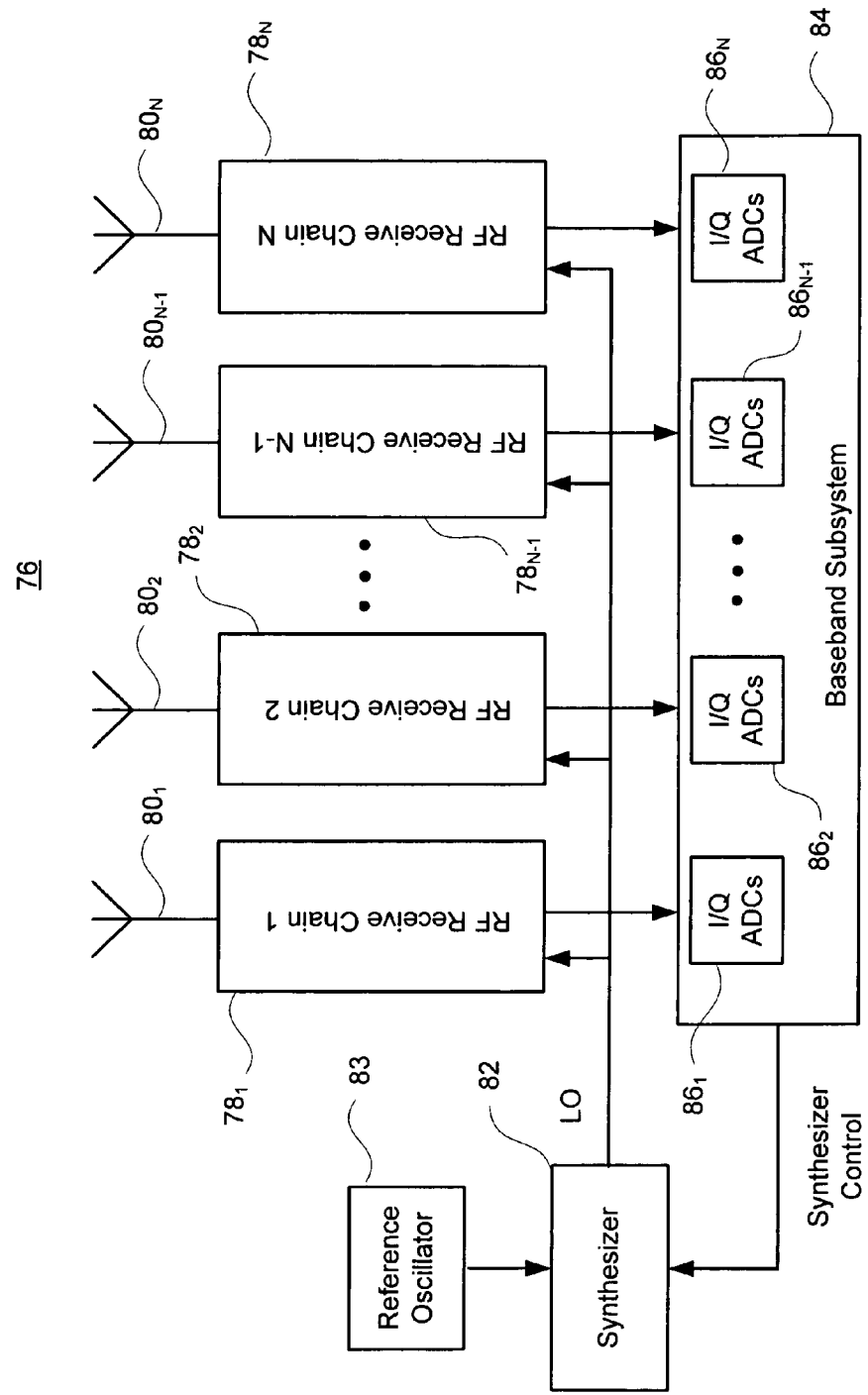
FIG. 6 illustrates a conventional MIMO architecture for a wireless mobile station.
Figure 7:
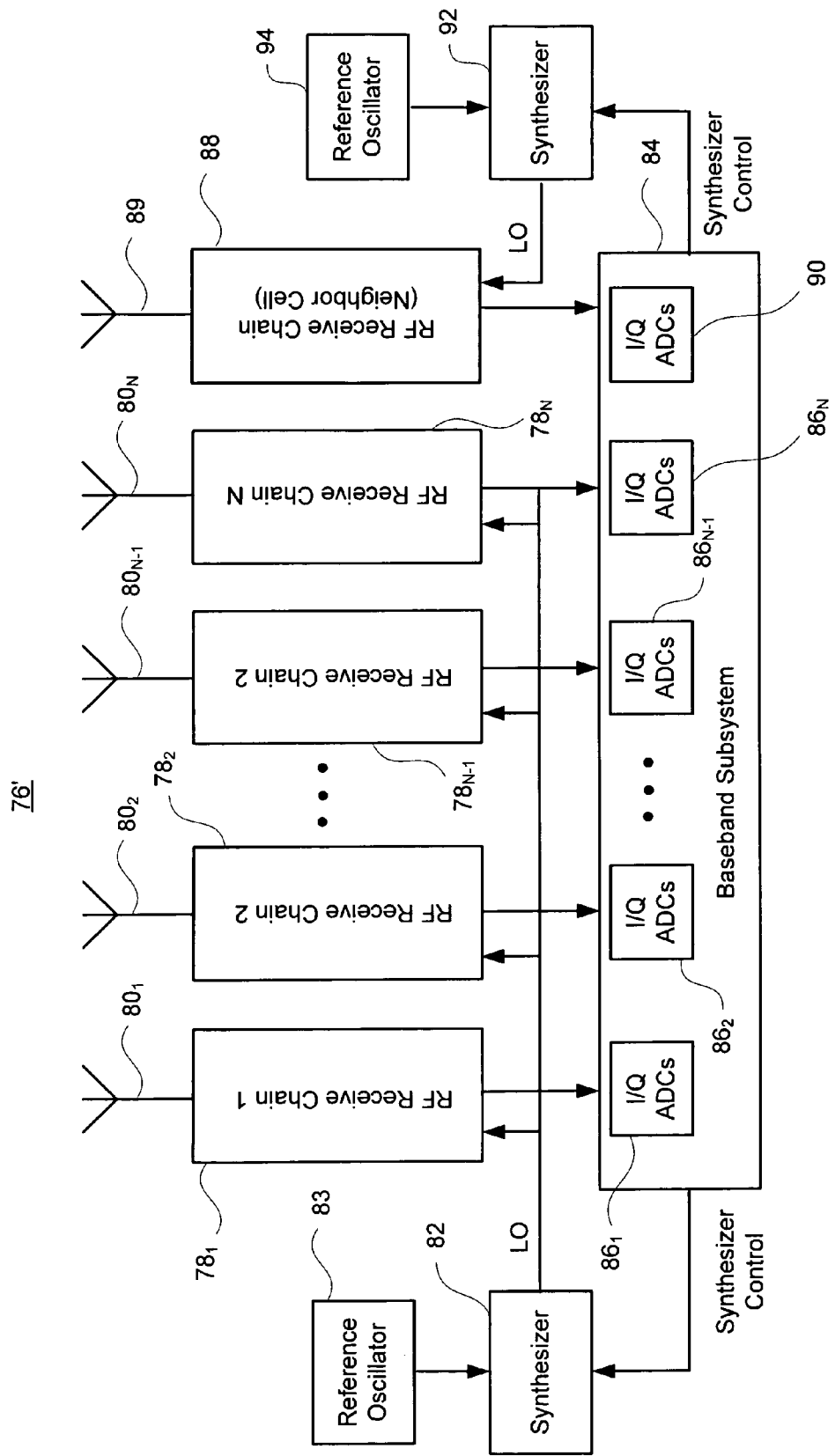
FIG. 7 illustrates another conventional MIMO architecture for a wireless mobile station.

The foregoing aspects, features and advantages of the present invention will be further appreciated when considered with reference to the following description of preferred embodiments and accompanying drawings, wherein like reference numerals represent like elements. In describing the preferred embodiments of the invention illustrated in the appended drawings, specific terminology will be used for the sake of clarity. However, the invention is not intended to be limited to the specific terms used.

In some wireless communication systems that have a serving BS and neighbor BSs, the client terminals or MSs need to make periodic measurements on other channels of the serving and neighbor base stations. To make such measurements the client terminal/MS may need to tune to other channels in the communication system. This may lead to interruption and degradation in the quality of service for the ongoing communication with the serving BS.

In analyzing the aforementioned problems with existing wireless systems, it has been discovered that when a client terminal or MS contains multiple receive chains, it does not always need to use all the receive chains. Furthermore, it has also been discovered that it may be possible to know or calculate ahead of time when one or more receive chains are not needed for normal operation. For instance, in accordance with an embodiment of the present invention, a preferred method involves the use of one or more receive chains for measurement purposes while maintaining communication with the currently serving base station.

One aspect of the present invention is to determine when one or more but not all receive chains are not necessary for the ongoing communication between the client terminal/MS and the serving BS. In one preferred example, the unused receive chains are used to tune to other channels for measurement purposes during the period(s) for which they are not necessary for the serving BS. This enables the client terminal/MS to always be in continuous communication with the currently serving BS and still be able to make measurements on signals on different channels.

In one implementation, two or more synthesizers are included in the receive chains of the RF subsystem. One synthesizer is used to tune one or more of the receive chains to maintain communication with the serving BS and the other synthesizer(s) can be used to tune the remaining receive chain(s) for measurement purposes. When all receive chains are tuned to the serving BS, the remaining synthesizers are turned off to save power. In a preferred example of an RF system employing the present invention, some receive chains can have dedicated synthesizers and others can have selectable synthesizer inputs.

Figure 8:
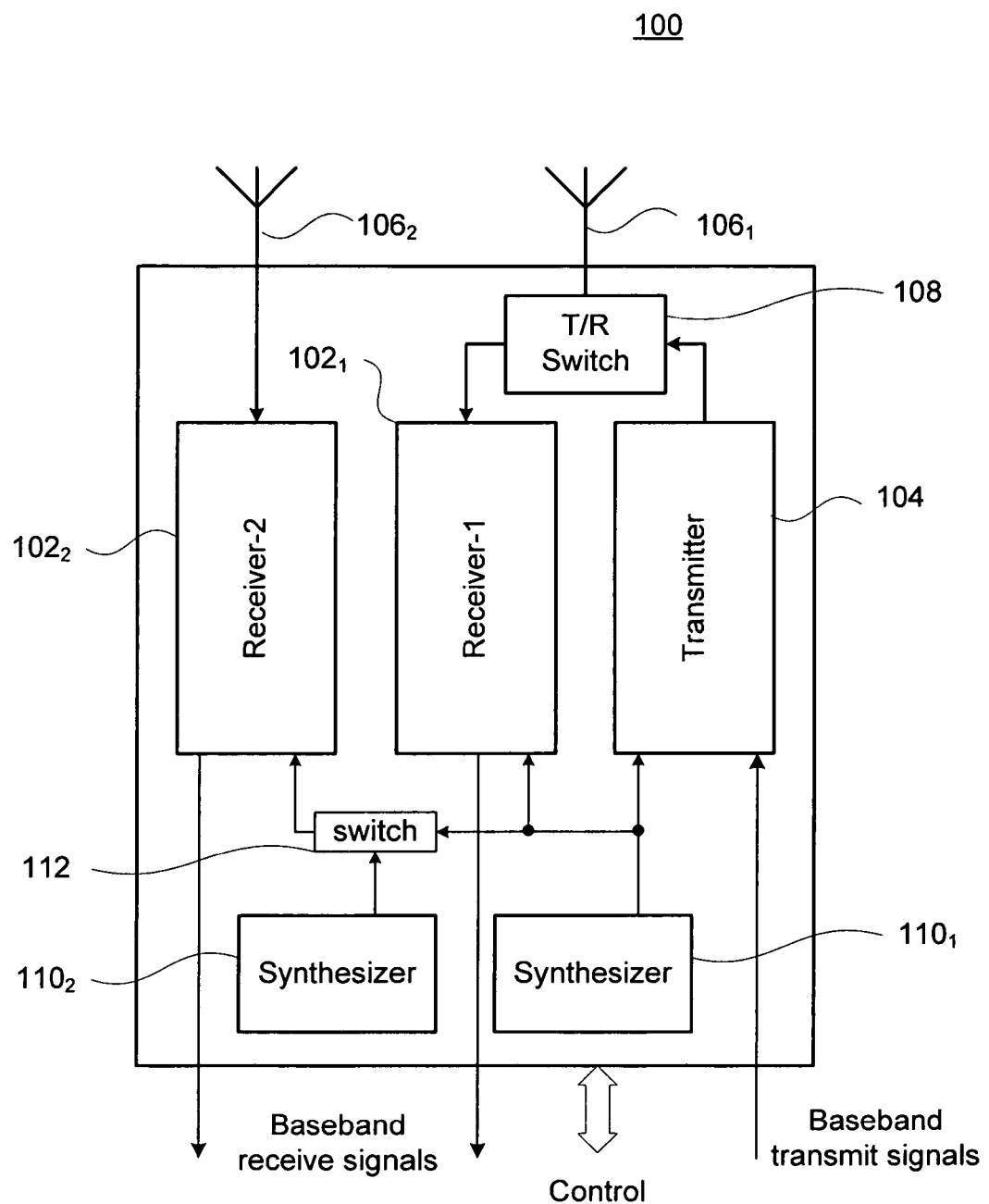
FIG. 8 illustrates an RF receive subsystem in accordance with aspects of the present invention.

FIG. 8 shows one such RF subsystem 100 having two RF receive chains $102_1$ and $102_2$ for a TDD wireless communication system. Here, transmitter 104 and receive chain $102_1$ are coupled to a first antenna $106_1$ via a transmit/receive switch 108. The receive chain $102_2$ is coupled to a second antenna $106_2$. The transmitter 104 and receive chain $102_1$ are also coupled to synthesizer $110_1$. Receive chain $102_2$ is coupled to synthesizer $110_1$ and to synthesizer $110_2$ via a switch mechanism 112.

In the present implementation, the receive chains $102_1$ and $102_2$ may both be tuned to the serving BS using synthesizer $110_1$. The receive chain $102_1$ is shown being slaved or dedicated to synthesizer $110_1$. In contrast, receive chain $102_2$ has a selectable synthesizer input. In this instance, the switch mechanism 112 passes signals from synthesizer $110_1$ to the receive chain $102_2$. In a preferred example, the remaining synthesizer $110_2$ is turned off, put into standby mode or otherwise disabled to save power, although this is not required.

Switch mechanism 112 may be a physical switch that may be, e.g., implemented in hardware and controlled by software or firmware through control lines connecting the switch mechanism 112 to a controller (not shown). Baseband transmit signals may be applied to transmitter 104 from a baseband subsystem such as baseband subsystem 16. Similarly, baseband receive signals may also be sent from receive chains $102_1$ and $102_2$ to the baseband subsystem. Overall control of the RF subsystem 100 may be provided by a controller or a signal processing unit, for instance the controller or signal processing unit in the baseband subsystem.

Figure 9:
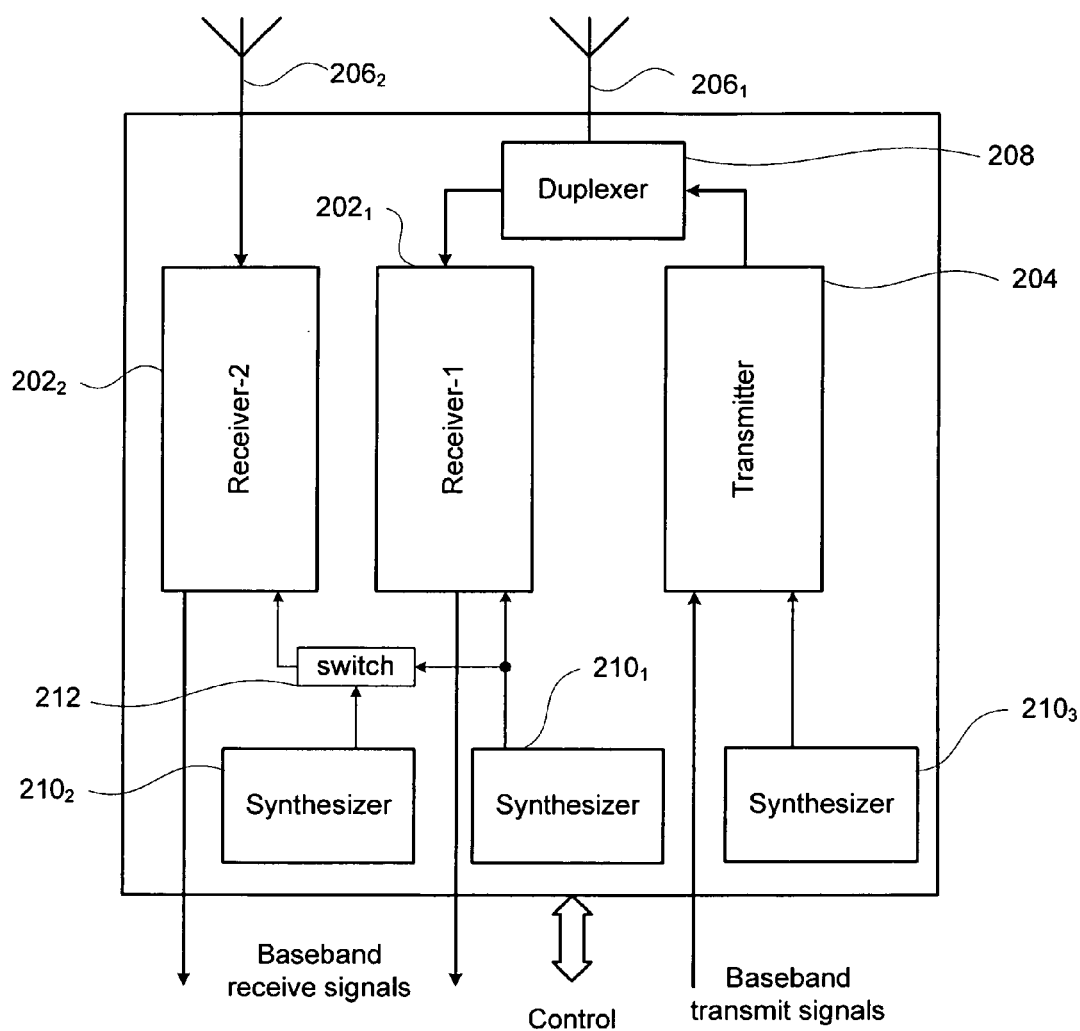
FIG. 9 illustrates an alternative RF receive subsystem in accordance with aspects of the present invention.

The architecture of RF subsystem 100 is also applicable to frequency division duplex ("FDD") wireless communication systems. FIG. 9 shows a RF subsystem 200 with two RF receive chains $202_1$ and $202_2$ for an FDD wireless communication system. Here, transmitter 204 and receive chain $202_1$ are coupled to a first antenna $206_1$ via duplexer 208. The receive chain $202_2$ is coupled to a second antenna $206_2$. The receive chain $202_1$ is also coupled to synthesizer $210_1$. Receive chain $202_2$ is coupled to synthesizer $210_1$ and to synthesizer $210_2$ via a switch mechanism 212. Due to the nature of FDD systems, transmitter 204 is coupled to separate synthesizer, namely synthesizer $210_3$.

In the present implementation, the receive chains $202_1$ and $202_2$ may both be tuned to the serving BS using synthesizer $210_1$. The receive chain $202_1$ is shown being slaved or dedicated to synthesizer $210_1$. In contrast, receive chain $202_2$ has a selectable synthesizer input. In this instance, the switch mechanism 212 passes signals from synthesizer $210_1$ to the receive chain $202_2$. In a preferred example, the remaining synthesizer $210_2$ is turned off, put into standby mode or otherwise disabled to save power, although this is not required.

As will be shown below, the aforementioned features are particularly applicable to MIMO systems, although the invention is well suited to a wide range of other applications as well.

Figure 10:
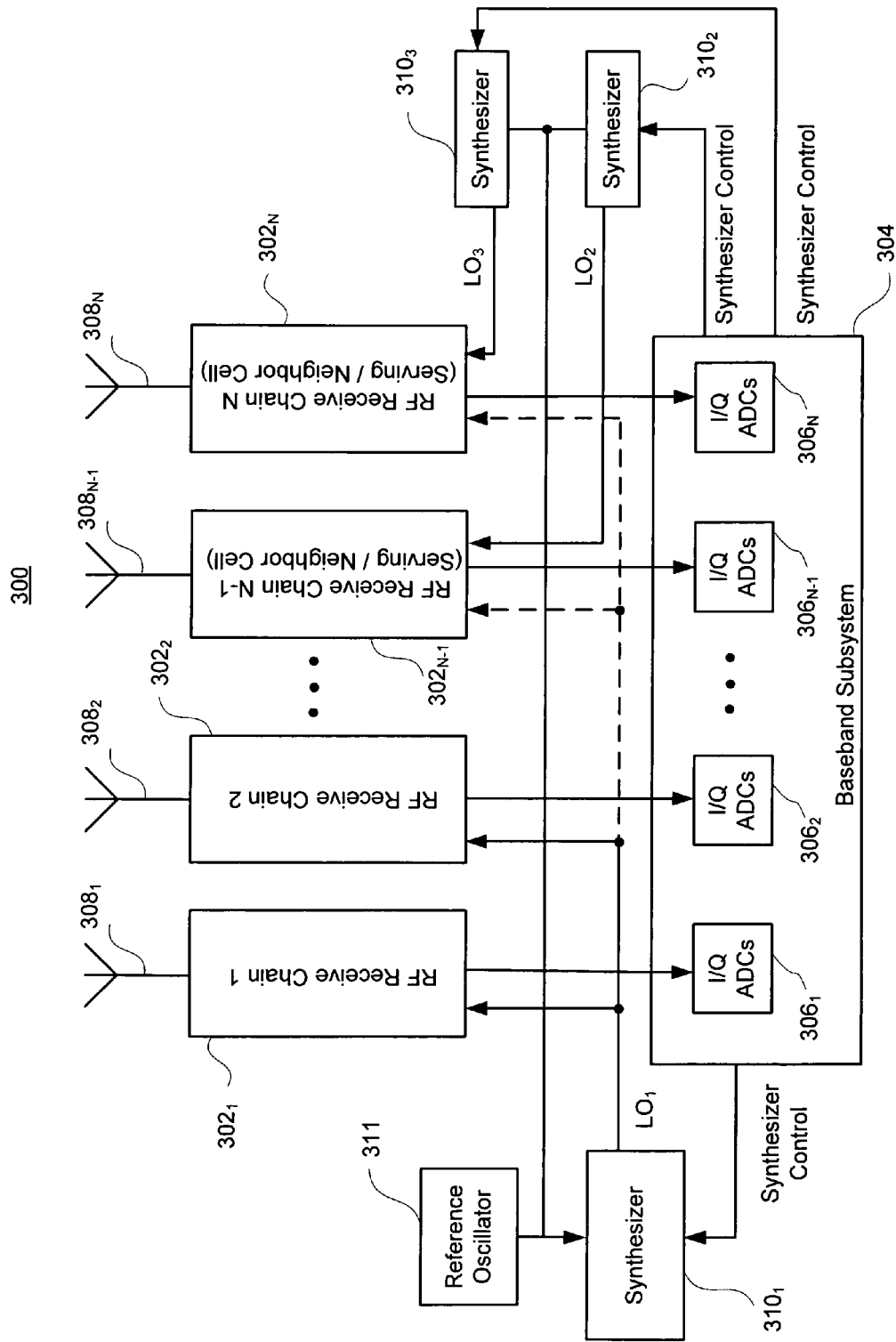
FIG. 10 illustrates an adaptive architecture in accordance with aspects of the present invention.

In a typical MIMO mobile communication system, periodically the MS does not need to use some of the RF receive chains for a portion of the time. In accordance with one aspect of the invention, mobile stations may take advantage of this situation by dynamically allocating some of the RF receive chains for serving cell reception and the remaining RF chains for neighbor cell reception simultaneously. In order to achieve this, separate synthesizers are required for some of the RF receive chains that can be tuned either to serving cell frequency or neighbor cell frequencies as shown in FIG. 10.

Here, system 300 includes a plurality of RF receive chains $302_1, 302_2, \ldots, 302_{N-1}, 302_N$. The receive chains are coupled to baseband processor 304. Preferably, each receive chain 302 is coupled to a respective I/Q ADC $306_1, 306_2, \ldots, 306_{N-1}$, or $306_N$ of the baseband processor 304. Each receive chain 302 is also coupled to a respective antenna $308_1, 308_2, \ldots, 308_{N-1}, 308_N$.

Synthesizer $310_1$ is fed by reference oscillator 311 and receives synthesizer control from the baseband processor 304. The synthesizer $310_1$ couples to a first subset of the receive chains 302, for instance receive chains $302_1$ and $302_2$. These receive chains are preferably tuned to a serving cell frequency based on a LO signal $LO_1$ from the synthesizer $310_1$. A second subset of the RF receive chains, e.g., receive chains $302_{N-1}, 302_N$, are tunable to either the serving cell frequency or to neighbor cell frequencies.

Here, additional synthesizers such as synthesizers $310_2$ and $310_3$ are also desirably fed by the reference oscillator 311, although different synthesizers may be fed by different reference oscillators. The synthesizers $310_2$ and $310_3$ also receive synthesizer control signals from the baseband processor 304. And as shown in the figure, this second subset of receive chains is preferably adaptively coupled to respective synthesizers. Thus, receive chain $301_{N-1}$ is coupled to synthesizer $310_2$ while receive chain $301_N$ is coupled to synthesizer $310_3$.

Furthermore, it is also desirable for this second set of receive chains to be coupled to synthesizer $310_1$ as shown by the dashed lines. This enables all of the receive chains to receive LO signals from synthesizer $310_1$ in a first mode of operation. And in a second mode of operation the second set of receive chains receives LO signals from other synthesizers, e.g., synthesizer $310_2$ and synthesizer $310_3$. In particular, synthesizer $310_2$ provides $LO_2$ and synthesizer $310_3$ provides $LO_3$.

These different modes of operation in an MIMO architecture are highly beneficial for at least the following reasons. Typically to accommodate MSs with different capabilities, the mobile communication network (serving cell) alternates between MIMO and non-MIMO modes of operation. Normally, the time of switching between MIMO and non-MIMO modes of operation is known a priori to a given MS.

When the mobile communication network is in a MIMO mode of operation, the MS can configure all the RF receive chains to tune to the same channel for MIMO from a single synthesizer, e.g., synthesizer $310_1$. Here, the system may turn off or otherwise disable the other synthesizers, e.g., synthesizer $310_2$ and $310_3$, to save power. In contrast, when the mobile communication network is using a non-MIMO mode of operation, the MS may configure one or more RF receive chains, e.g., receive chains $302_1$ and $302_2$, to tune for serving cell and use the rest of the RF receive chains, e.g., receive chains $302_{N-1}$ and $302_N$, to tune for neighbor cells.

This provides substantial benefits to the overall system. Performance benefits include the following. First, such adaptive MIMO operation provides better neighbor cell reception and tracking to improve hand-offs. There is no interruption to user traffic during to neighbor cell reception. Interference is reduced due to improved measurements that assist for optimized cell reselection and hand-offs. The system 300 is able to reduce power consumption by turning off unused synthesizers.

Other benefits include cost and form factor savings. For instance, the embodiment illustrated in FIG. 10 allows a system designer to eliminate part of the dedicated RF receive chain and data converters for neighbor cell reception. And for a MS that supports multiple bands, the adaptive architecture provides even greater benefits by reducing the number of redundant components.

In certain situations it is important to decide which receive chain(s) is tuned for the serving BS and which receive chain(s) are tuned for measurement purposes, as this allows one to achieve optimum diversity and power savings.

The flow diagram 400 of FIG. 11A illustrates an algorithm in accordance with the invention that dynamically determines when, how, and which receive chains to tune to the serving BS for ongoing communication and to other channels of the serving and neighbor BS for measurements. A decision of what receive chain(s) are tuned for the serving BS and what receive chain(s) are tuned for measurement purposes may be made based upon a number of parameters.

The process starts at step S400 and at step S402 a determination is made as to the total number of receive chains $R_T$ that are available in a given RF subsystem. Next, at step S404 the total number of synthesizers $S_T$ in the RF subsystem is determined. Other a priori information about the RF subsystem, the MS and/or the overall network may be identified in step S406. Such a priori information about the system and the client terminal/MS may include control messages describing the attributes of the communication link, signal condition indicators such as signal to noise ratio ("SNR"), carrier to interference and noise ratio ("CINR"), etc. for each RF receive chain.

In most situations it is likely that the total number of receive chains $R_T$, total number of synthesizers $S_T$, and the a priori information is static, or in the case of some types of a priori information, it may change slowly over time. Thus, in one example, this information may only be refreshed or updated when the mobile station is powered on. In another example, a priori information pertaining to the communication link, SNR and CINR may be updated periodically, such as after a given number of frames, after a transition to a new serving BS, or upon a change in the status of any of the receive chains and/or synthesizers in the mobile station.

Next, at step S408 a determination is made as to the number of receive chains $N_S$ out of the total number of receive chains $R_T$ that are needed to receive a signal from a currently serving BS for a given basic unit of time. This may be done based on the broadcast and/or unicast control messages, as well as upon signal conditions. The basic unit of time may be, e.g., a timeslot or symbol duration. The determination may be made once per decision period, e.g., once per frame or in a given number of milliseconds. The output of step S408 may be a series of values which may be stored as an array $N_S[\ ]$ at step S410. The array $N_S[\ ]$ is preferably indexed by a given unit of time t. Alternatively, the process make reevaluate the determination continuously.

Then at step S412 a comparison is made between the total number of receive chains $R_T$ and the indexed values $N_S[t]$. If $R_T$ is less than or equal to a given $N_S[t]$ for a current time unit, then the process proceeds to step S414. Here, the $R_T$ receive chains are connected to a single synthesizer which is tuned to a channel used by the currently serving BS. At this point several actions may occur. For instance, once the receive chains $R_T$ are coupled to the given synthesizer, the other remaining synthesizers, of which there are $S_T-1$, may be turned off as shown in step S416. Additionally, processing of received signals may also take place. Such processing will be discussed in detail below with regard to flow diagram S450 of FIG. 11B. Before turning to FIG. 11B, it can be seen in FIG. 11A that once the $R_T$ receive chains are connected to the given synthesizer and unused synthesizers are turned off or reduced in power, the evaluation process preferably returns to step S408.

In the case where $R_T$ is greater than a given Ns[t], then the process proceeds to step S418. Here, a determination is made as to which of the receive chains out of all receive chains $R_T$ are presently best suited for processing signals from the serving BS. This determination may be made, by way of example only, based upon antenna diversity of the antennas, e.g., antennas 308 of FIG. 10, which are coupled to respective receive chains 302. Alternatively, the top $N_S$ receive chains with the highest SNR and/or CINR are preferably selected.

Once a given number of receive chains $N_S$ are selected, the selected receive chains $N_S$ are connected or otherwise coupled to one synthesizer such as synthesizer $310_1$ of FIG. 10 at step S420. This synthesizer is tuned to the channel used by the presently serving BS. At this point several actions may occur. For instance, processing of received signals may take place as will be discussed in detail below with regard to flow diagram 450 of FIG. 11B.

Figure 11B:
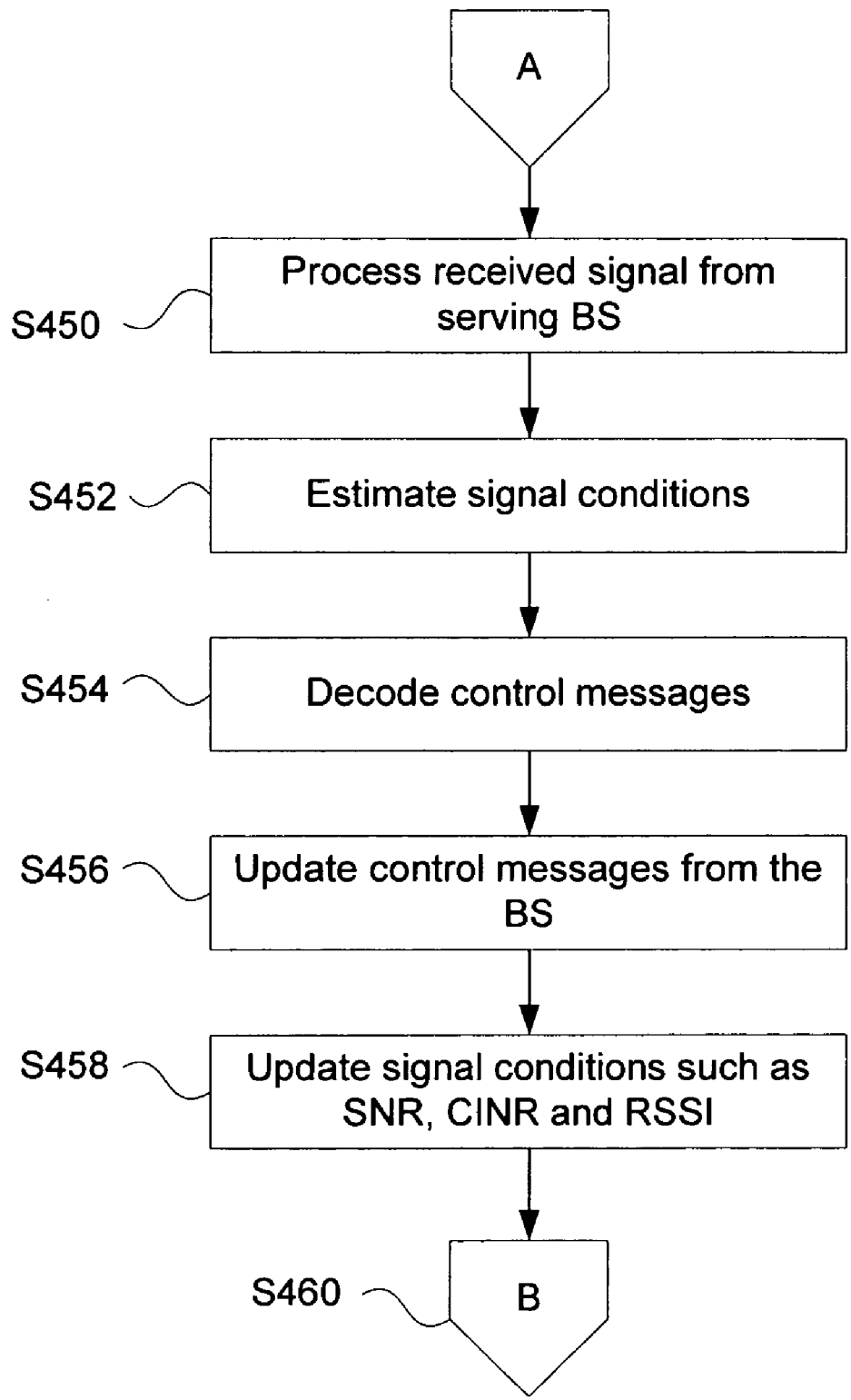

Before turning to FIG. 11B, it can be seen at step S422 that the remaining receive chains, of which there are $R_T-N_S$ in total, are preferably each coupled or otherwise dynamically allocated to different synthesizers such as synthesizers $310_2$ and $310_3$ of FIG. 10. These remaining receive chains are desirably tuned to different channels to make measurements of different neighbor base stations. At step S424, if there are any remaining synthesizers which are not coupled to a receive chain then those unused synthesizers are preferably turned off or reduced in power. At this stage the evaluation process preferably returns to step S408.

In general a receive chain is not specifically intended for a serving or neighbor cell. The receive chains are connected to one particular synthesizer LO at any given time. The synthesizer can be tuned to whatever frequency of interest (serving or neighbor). To allow full flexibility in the receive chain allocation in accordance with an aspect of the present invention, the synthesizer input selection can be provided to all the receive chains. With this flexibility, any subset of receive chains can be selected for the serving cell while leaving the rest for measurements. Typically though, only one receive chain needs a selectable synthesizer input. The rest of the receive chains can be tied to a single synthesizer input. In the case of only two receive chains, a single receive chain with selectable synthesizer input is capable of providing full flexibility of allocating either of the receive chains to serving or neighbor cell.

In a preferred embodiment, all of the receive chains ($R_T$) are selectable and assignable either to a channel of the serving base station or to a channel of a neighbor base station. Thus, while a given receive chain may be one of the selected receive chains ($N_S$) assigned to the serving cell/BS at a given point in time, it should be understood that at a subsequent point in time the given receive chain may be one of the remaining receive chains that is assigned to a neighbor cell/BS. Such selectability provides a robust architecture that enables the system to utilize the most appropriate receive chains depending upon network, client and channel parameters.

As indicated in FIG. 11A, additional activities may occur after steps S414 and S420, which is identified in this figure by item A at step S426. FIG. 11B illustrates flow diagram 450 which begins at item A identified in FIG. 11A. As shown in FIG. 11B, the following processing and/or updating steps may be performed. The specific order of steps is exemplary.

In step S450, the signal(s) received from the serving BS is processed. At step S452, signal conditions are estimated. As shown at step S454 control messages are decoded. In accordance with step S456, control messages from the BS may be updated. And signal conditions are preferably updated at step S458. Examples of signal conditions which may be updated are the SNR, CINR and received signal strength ("RSSI") for one or more receive chains. Once such processing and/or updating is conducted, results may be provided back to step S408 of FIG. 11A as shown via item B at step S460.

The algorithms/processes of FIGS. 11A and 11B may be implemented in software, hardware, firmware or any combination. In one example, software embodying the algorithms/processes can be executed in an MCU, SPU or in both. The software may reside in internal or external memory and any data may be stored in such memory. The hardware may be an application specific integrated circuit ("ASIC"), field programmable gate array ("FPGA"), discrete logic components or any combination of such devices.

Given the aforementioned features, it should be understood that the present invention may be utilized in a wide variety of situations. For instance, one such situation applies to the IEEE 802.16 wireless standard. In the case of the IEEE 802.16 standard, which involves using an orthogonal Frequency Division Multiple Access ("OFDMA") physical layer, also known as "mobile WIMAX," the client terminal or MS needs to maintain a continuous link with the serving base station with as minimum interruption as possible and also make measurements on the neighboring base stations at regular intervals.

To enable this capability, the IEEE 802.16 standard defines what is known as a "scanning interval" which allows the client terminal to tune to a different channel to make measurements on neighbor base stations.

Figure 12:
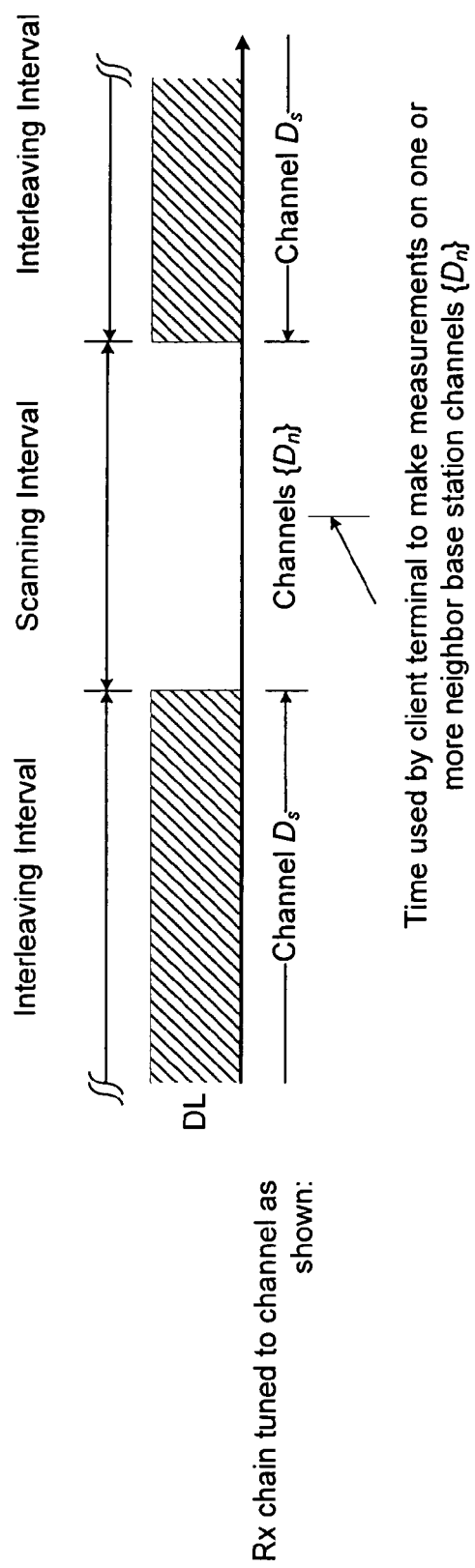
FIG. 12 illustrates a single receive chain mobile WiMAX measurement process.

FIG. 12 illustrates a situation in which a mobile WiMAX client terminal employs one RF receive chain to do the communication with the serving cell (tuned to Channel $D_s$) and do the measurements on the neighbor base stations during the scanning interval (tuned to one or more set of Channels $\{D_n\}$). At the end of the scanning interval, the RF receive chain is re-tuned to the serving base station.

Figure 13:
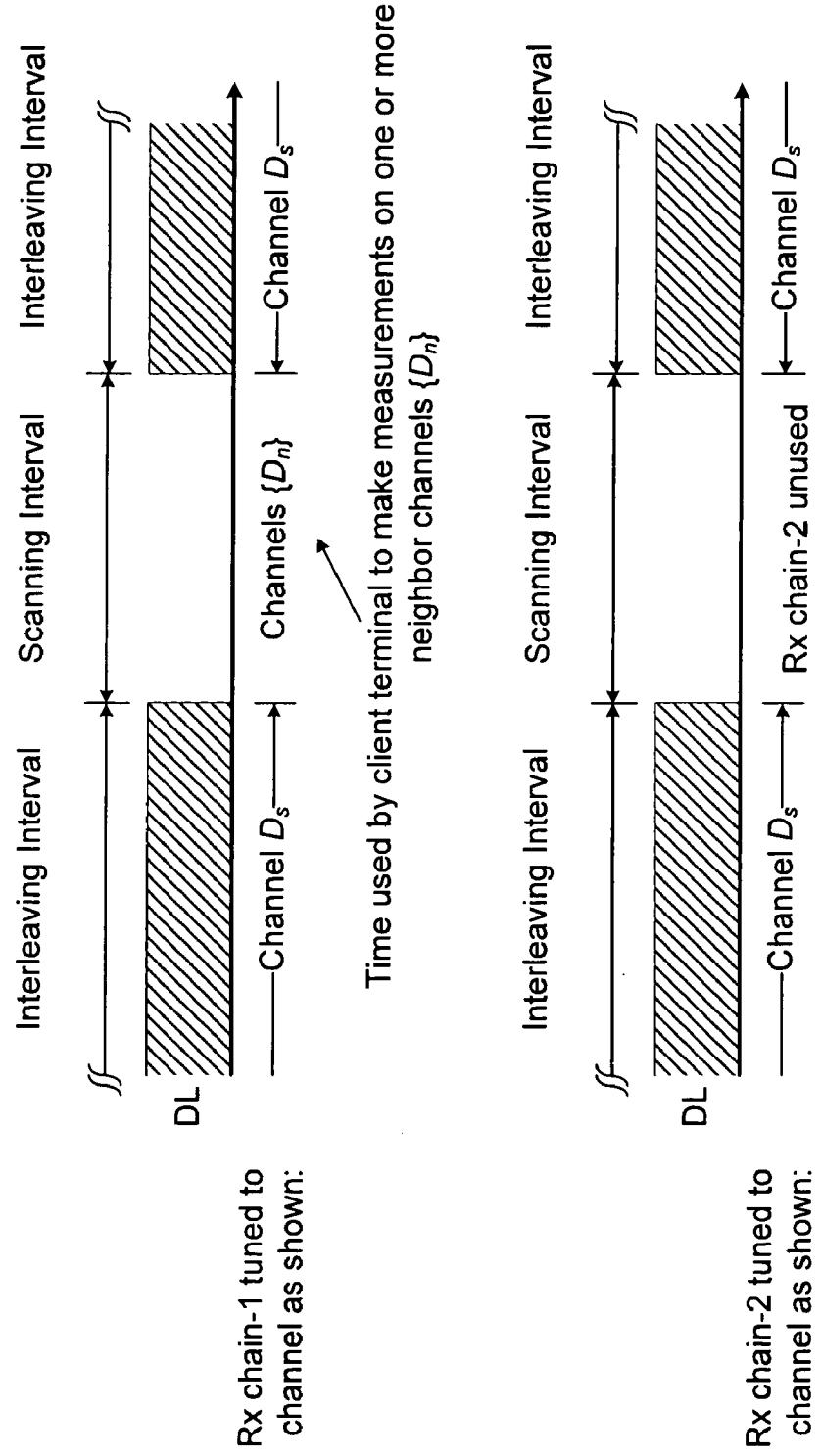
FIG. 13 illustrates a dual receive chain mobile WiMAX measurement process.

FIG. 13 presents a situation in which the mobile WiMAX client terminal has two RF receive chains tuned by the same synthesizer. Here, both of the receive chains are normally tuned to the serving base station to communicate with the serving base station (tuned to Channel $D_3$). During the scanning interval one or both receive chains are tuned to the neighbor base station to do the measurements (tuned to one or more set of Channels $\{D_n\}$) At the end of the scanning interval, both the RF receive chains are re-tuned to the serving base station.

The scanning interval requires both the client terminal and the serving base station to pause the communication and resume it after the scanning interval. Unfortunately, this may lead to increased latency in data transfer and/or reduction in throughput. For real time applications increased latency may degrade performance. Also, negotiation of the scanning interval creates additional signaling overhead.

In mobile WiMAX, client terminals with different capabilities may co-exist. For example client terminals with one RF receive chain can exist along with client terminals with two or more RF receive chains. The base station groups the information transmission according to the capabilities of the client terminals. Based on the control messages, the client terminal determines the portion of the frame during which the serving base station is sending information to single receive chain capable client terminals.

A client terminal can often also determine whether there is any information directed specifically towards it. In accordance with aspects of the invention, this allows the client terminal to determine whether it needs to use all the receive chains for receiving the signal from the serving base station. Once the determination is made about the portion of the frame that does not require use of both the receive chains, the client terminal tunes the unused receive chain to the neighbor base station channels for measurement purposes if necessary.

Figure 14:
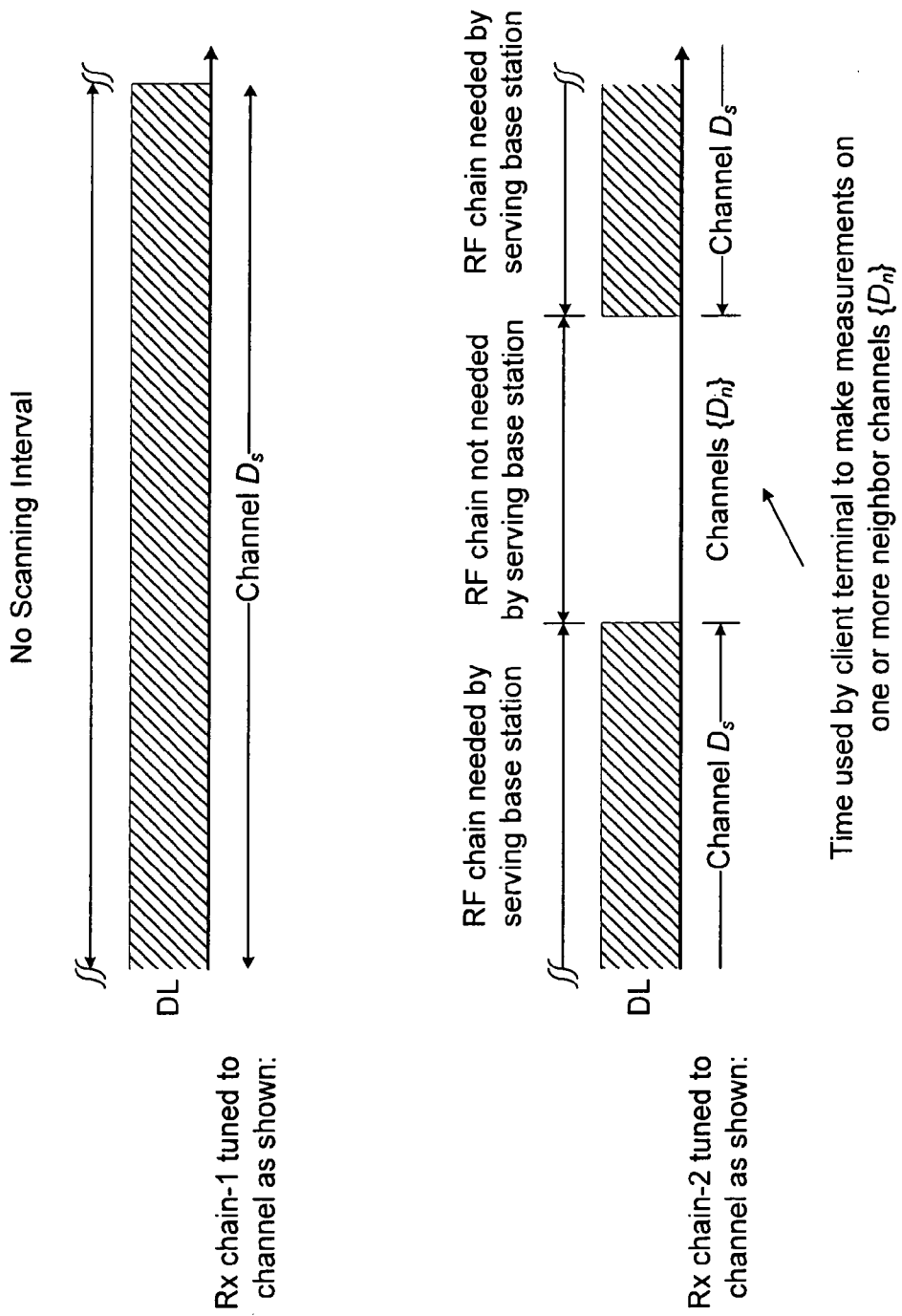
FIG. 14 illustrates a multi-receive chain multi synthesizer mobile WiMAX measurement process.

FIG. 14 presents a situation in accordance with aspects of the invention in which a mobile WiMAX client terminal with an RF subsystem employs two RF receive chains with separate synthesizers. Here, the mobile WiMAX client terminal has the ability to tune both the RF receive chains to the same channel or different channels, such as discussed above with regard to FIG. 10. In this example, it can be seen that there is no need to pause the communication and resume it after the scanning interval because there is no scanning interval as in FIGS. 12 and 13. Thus, issues such as increased latency and signaling overhead are avoided.

As shown in FIG. 14, the first receive chain does not employ a scanning interval. Rather, the first receive chain is tuned to Channel $D_s$ as shown. The second receive chain is shown as having a portion of time during which it is not needed by the serving BS (is not tuned to Channel $D_s$). During this time, the client terminal/MS may employ the second receive chain to make measurements on one or more neighbor channels, e.g. by tuning to Channels $\{D_n\}$ as shown.

Figure 15:
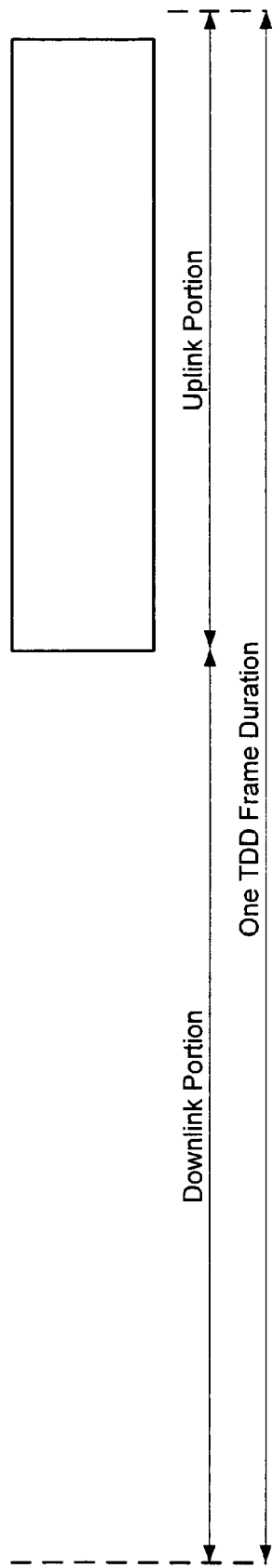
FIG. 15 illustrates time division duplex operation of an IEEE 802.16 system.

An example of the frame structure of the TDD mode of the IEEE 802.16 system is shown in FIG. 15. To accommodate mobile stations with different capabilities, IEEE 802.16 network requires use of multiple receive chains only during portion of the TDD frame.

In accordance with aspects of the invention, the client terminal determines, preferably at the beginning of each frame, what portion of the frame does not require all the available receive chains based on the control messages and signal conditions.

As discussed herein, the decision of which receive chain(s) are tuned for the serving base station and which receive chain(s) are tuned for measurement purposes can be made by various parameters that include but not limited to a priori information about the system and the client terminal, control messages describing the attributes of the communication link, signal condition indicators such as Signal to Noise Ratio (SNR), Carrier to Interference and Noise Ratio (CINR), etc. for each RF receive chain.

In accordance with a preferred embodiment of the invention, such tuning decisions are particularly applicable to a MIMO based MS implementation for emerging broadband wireless systems such as the IEEE 802.16 family and other OFDMA based next generation mobile networks.

To accommodate mobile stations with different capabilities, IEEE 802.16 network uses MIMO only during portion of the TDD frame. During the portion of the frame when the network is in non-MIMO mode of operation, the MS can configure the some of the RF receive chains for neighbor cell reception as discussed above. Thus, in accordance with the invention as shown in FIG. 15, the period after reception of broadcast information and prior to the period when decoding requires multiple receive chains enables the mobile station to employ selected RF receive chains for neighbor base station reception.

By employing aspects of the present invention, client terminal RF subsystems obtain additional flexibility, for instance about when to do the measurements on the neighbor base stations. Depending on the situation, there may be a reduced requirement or no requirement of the scanning interval. This advantageously reduces or eliminates the signaling overhead associated with the scanning interval negotiation process.

The present invention is also applicable to other technologies. By way of example only, wideband CDMA ("WCDMA") is a very popular technology finding use in many networks around the globe. General background information concerning WCDMA may be found in the text "WCDMA for UMTS—Radio Access for Third Generation Mobile Communications" edited by Holma and Toskala, copyright 2000 by John Wiley & Sons, Ltd, the entire disclosure of which is hereby expressly incorporated by reference herein.

In ITU WCDMA systems, use of multiple receive chains is not mandatory in the client terminals. However, some client terminals are designed with multiple receive chains to achieve performance improvement. In accordance with WCDMA standards, a client terminal is required to maintain a continuous link with the serving base station with as few interruptions as possible. The client terminal must also make measurements on the neighboring base stations on regular intervals.

To enable this capability, WCDMA standards define what is known as a "compressed mode" that creates transmission gaps from the serving base station during which the client terminal can tune to a different channel and make neighbor cell measurements. However, the transmission gap from the serving base station using the compressed mode creates a short term but frequent reduction in data rate and/or performance. The transmission gap also creates overhead in terms of managing the necessary adjustments in power control and other attributes of the wireless link before and after the compressed mode. Such issues are undesirable.

Figure 16:
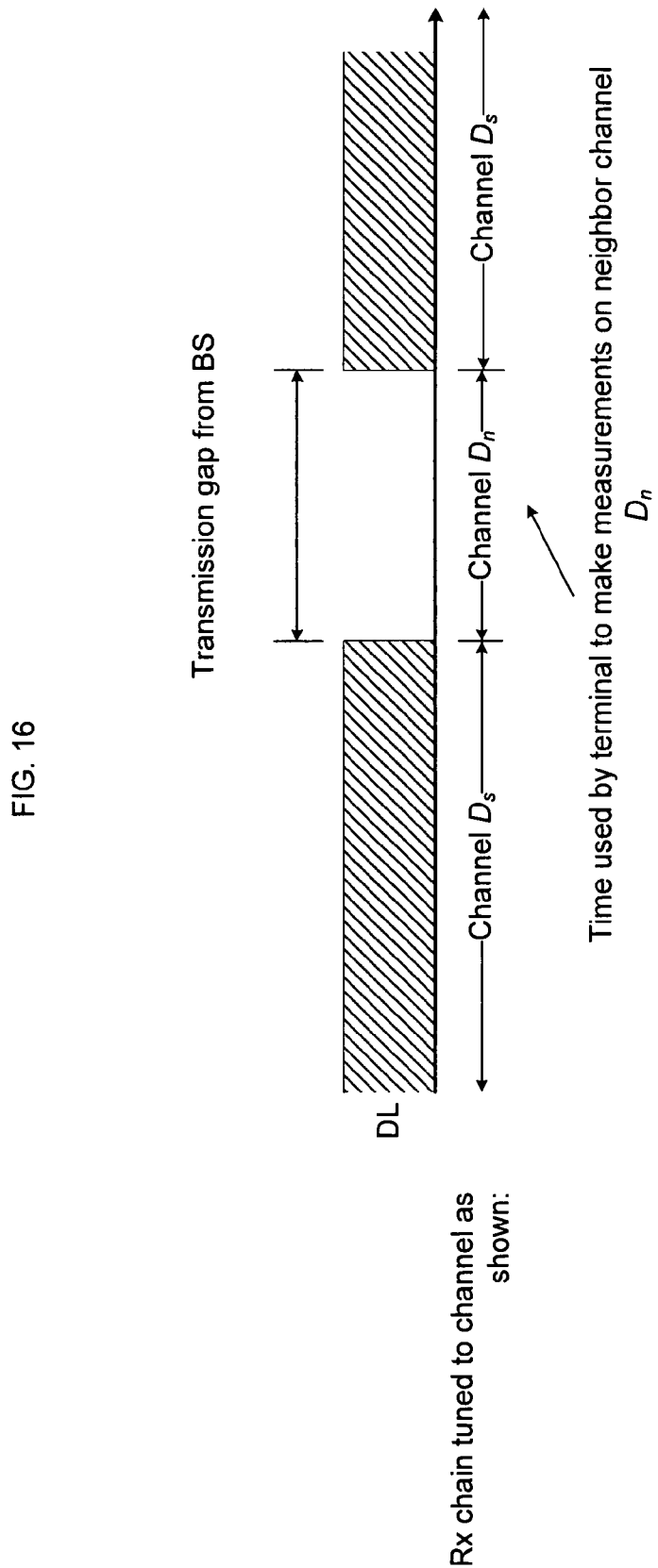
FIG. 16 illustrates a measurement scenario for a wideband CDMA mobile station.

FIG. 16 shows a measurement scenario for a WCDMA client terminal having one RF receive chain configured to conduct communication with the serving base station (tuned to Channel $D_s$) and do the measurements during the transmission gap of the compressed mode (tuned to Channel $D_n$). At the end of the transmission gap, the RF receive chain is re-tuned to the serving base station channel $D_s$.

Observe that the WCDMA receiver with one RF receive chain must allow temporary degradation in the connection with the base station in order to make measurements. Furthermore, the base station and the client terminal must co-ordinate the exact timing of the transmission gap from the base station so that the client terminal can be prepared to make the measurements at that time.

Figure 17:
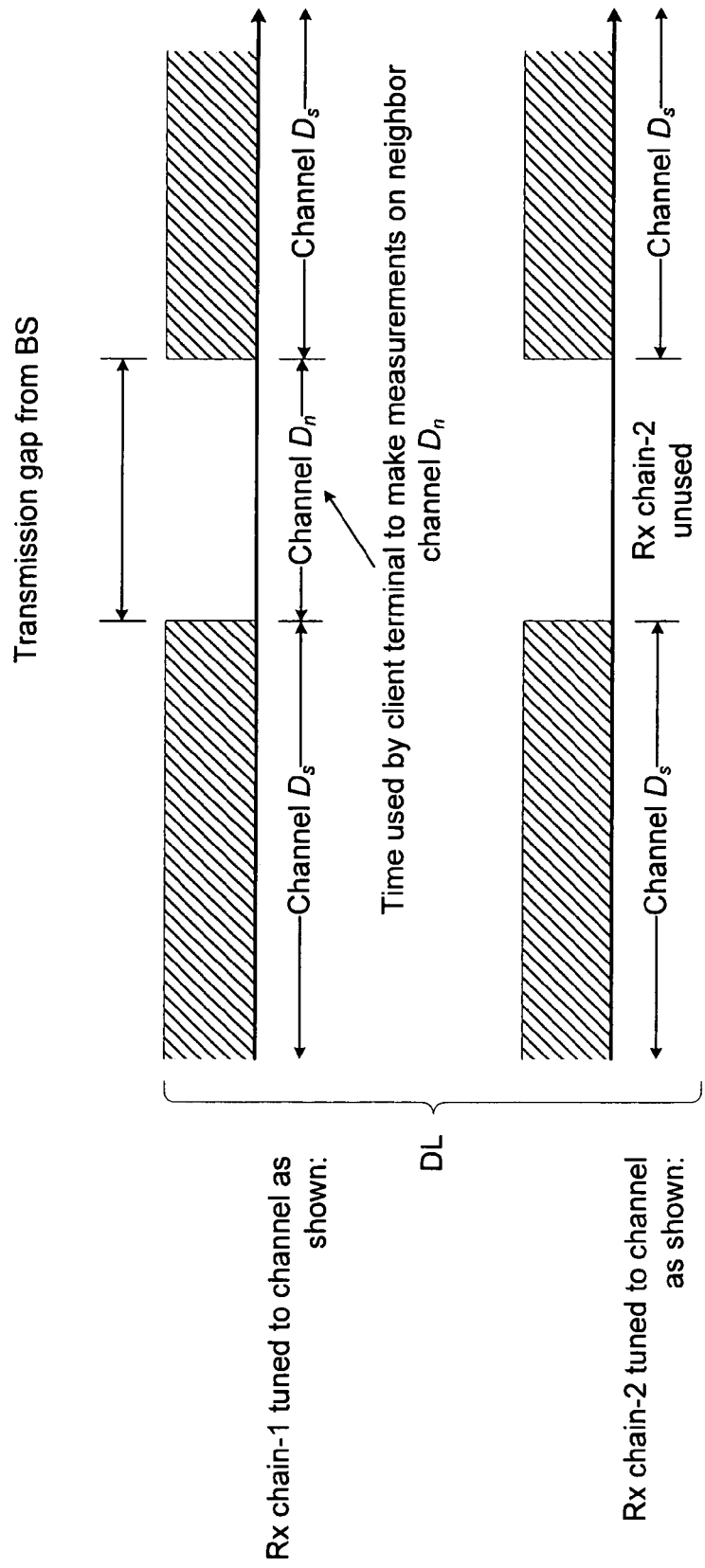
FIG. 17 illustrates a measurement scenario for a dual receive chain wideband CDMA mobile station.

FIG. 17 shows a measurement scenario for a WCDMA client terminal having two RF receive chains tuned by the same synthesizer. Both of the receive chains are tuned to the serving base station to communicate with the serving base station (tuned to Channel $D_s$). During the transmission gap of the compressed mode it is shown that one or both receive chains are tuned to the neighbor base station to do the measurement (tuned to Channel $D_n$). At the end of the transmission gap, both the RF receive chains are re-tuned to the serving base station channel. If only one of the receive chains is used for measurement, the remaining receive chain(s) is unused.

A WCDMA client terminal with two receive chains in a traditional RF subsystem can improve the downlink performance as compared to a WCDMA client terminal with a single receive chain. However, to make measurements in a conventional system, the base station must still create a transmission gap and co-ordinate the timing of the gaps with the client terminal. The client terminal in turn must tune either both the receive chains to the same neighbor base station during the gap or not use one of the RF receive chains. In either case, the client terminal must coordinate with the base station for the transmission gap timing and the ongoing communication with the current serving base station is interrupted.

In accordance with aspects of the present invention, one or more of the receive chains are tuned to the serving base station to maintain the communication while the remaining receive chains can be tuned for measurements on the other channels of the serving base station or on the neighbor base stations. This enables continuous transmission from the base station and continuous reception by the client terminal without having a full receive chain dedicated for just measurement purposes. This architecture combines the benefit of the performance improvement of multiple receive chains with the ability to make measurements of neighbor base stations without interrupting communication with the serving base station.

Thus, it is possible to make measurements without requiring a transmission gap from the base station. The client terminal can temporarily reassign or tune one of the receive chains to the neighbor base station to make measurements and then reassign/tune the same RF receive chain to the serving base station. This can be done without coordinating with the serving base station. Also, the actual amount of time for which the measurement is made is preferably up to the discretion of the client terminal. This may be set to a predetermined value, may be periodically updated or may be calculated based on received and/or measured data such as SNR, CINR, RSSI, etc.

Figure 18:
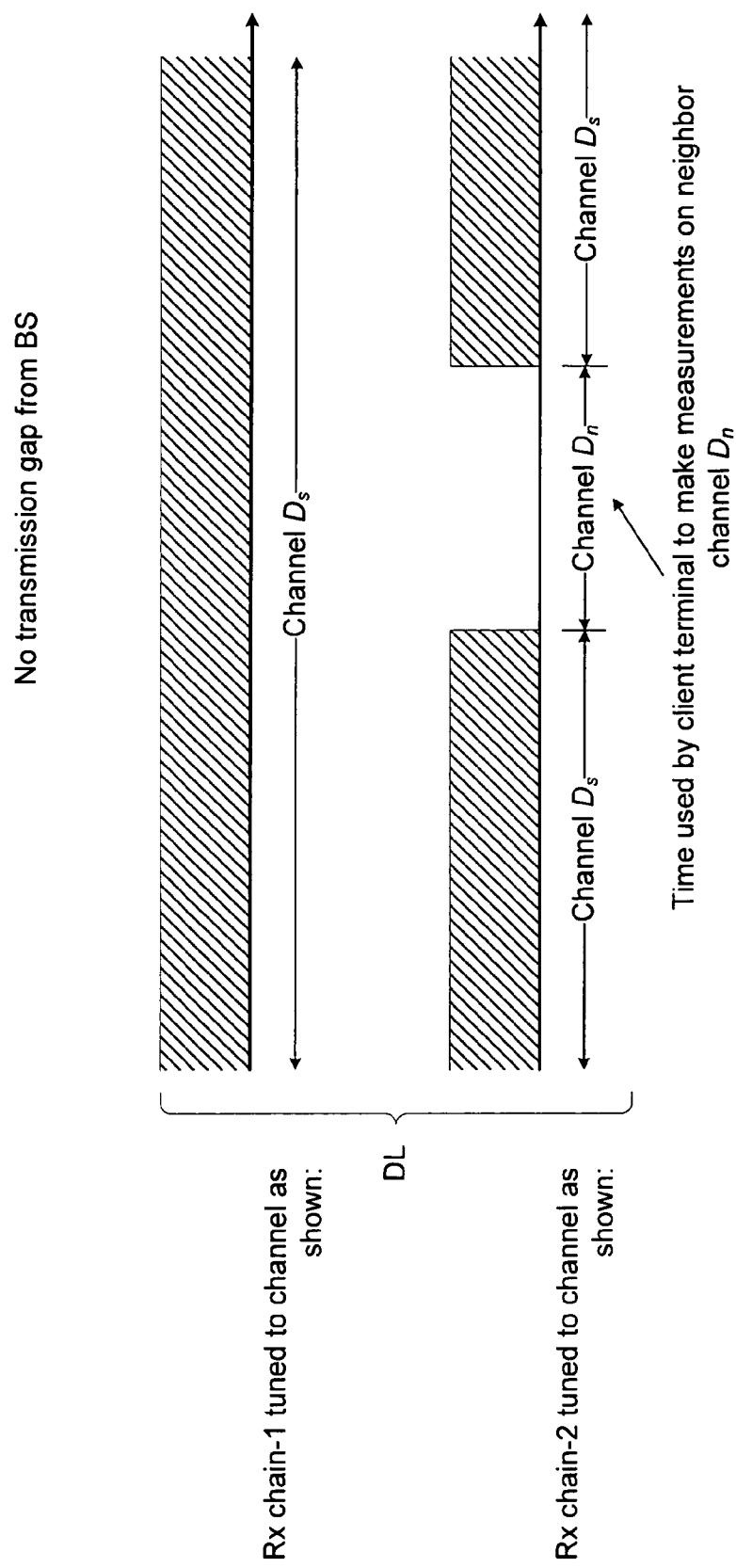
FIG. 18 illustrates a measurement scenario for a multi-receive chain multi synthesizer wideband CDMA mobile station.

FIG. 18 shows a measurement scenario for a W-CDMA client terminal in accordance with aspects of the present invention. Here, the client terminal's RF subsystem desirably uses two RF receive chains with separate synthesizers with the ability to tune both the RF receive chains to the same channel or different channels. Normally both the receive chains are tuned to the serving base station to communicate with it (tuned to Channel $D_s$). Whenever there is a need for measurement of a neighbor channel, one of the receive chains is tuned to the neighbor base station (tuned to Channel $D_n$) while the other receive chain is continuously tuned to the serving base station without any interruption.

In one alternative, it is preferred that the exact time and duration of the measurement for the neighbor base station may be flexible and need not require any co-ordination with the base station. In this case, a processor or algorithm/application which is part of the baseband subsystem or elsewhere in the mobile station may decide when to do the measurement with the neighbor base station and when to use both the receive chains to communicate with the serving base station. This process allows for the combination of the benefits of multiple receive chains for performance improvement and neighbor base station power measurement.

As explained above, the present invention permits flexible allocation of the RF receive chains which may be done on an as needed basis. The receive chain allocation strategy desirably balances the need for measurements with the need for improved performance. The decision of what receive chain(s) are tuned for the serving base station and what receive chain(s) are tuned for measurement purposes can be made by various parameters that include but not limited to a priori information about the system and the client terminal, control messages describing the attributes of the communication link, signal condition indicators such as SNR, CINR, etc. for each RF receive chains.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims. Aspects of each embodiment may be employed in the other embodiments described herein.

For instance, flexible allocation of receive chains may be done for any embodiment of the invention. Such allocation may be based on any or all of the parameters as set forth herein, including but not limited to SNR, CINR, RSSI, etc. And with respect to the methods described herein, it should be understood that the operations do not have to be performed in the precise order described above. Rather, various steps can be handled in reverse order, non-sequential order, or simultaneously.

The invention claimed is:

1. A wireless mobile station, comprising:
a baseband subsystem including a controller and a signal processing unit operatively connected to the controller, the baseband subsystem being operable to generate one or more synthesizer control signals; and
a radio frequency subsystem operatively connected to the baseband subsystem, the radio frequency subsystem including:
a transmitter operable to obtain transmit signals from the baseband subsystem, process the transmit signals and to send out the processed transmit signals from the wireless mobile station;
a plurality of synthesizers, a first one of the plurality of synthesizers being operable to generate a first local oscillating signal and a second one of the plurality of synthesizers being operable to generate a second local oscillating signal; and
a plurality of radio frequency receive chains operable to receive signals from at least one base station, to process the received signals and to send the processed received signals to the baseband subsystem, a first one of the plurality of radio frequency receive chains receiving the first local oscillating signal from the first synthesizer in a first mode of operation according to the one or more synthesizer control signals, the first radio frequency receive chain receiving the second local oscillating signal from the second synthesizer in a second mode of operation according to the one or more synthesizer control signals, and a second one of the plurality of radio frequency receive chains receiving the first local oscillating signal from the first synthesizer in both the first and second modes of operation.

2. The wireless mobile station of claim 1, further comprising a switch mechanism coupling the first and second synthesizers to the first receive chain, the switch mechanism switching between the first and second local oscillating signals based upon a switching signal from the controller.

3. The wireless mobile station of claim 1, wherein the transmitter receives the first local oscillating signal from the first synthesizer in both the first and second modes of operation.

4. The wireless mobile station of claim 1, wherein a third one of the plurality of synthesizers is operable to generate a third local oscillating signal and the transmitter receives the third local oscillating signal from the third synthesizer in both the first and second modes of operation.

5. The wireless mobile station of claim 1, wherein in the first mode of operation both the first and second receive chains are tuned to a serving base station and wherein in the second mode of operation the first receive chain is tuned to a neighbor base station and the second receive chain remains tuned to the serving base station.

6. The wireless mobile station of claim 5, wherein in the first mode of operation the second synthesizer is disabled.

7. A transceiver subsystem for use in a wireless mobile station, the transceiver subsystem comprising:
  a transmitter operable to process input signals and to send out the processed input signals from the wireless mobile station;
  a plurality of synthesizers, a first one of the plurality of synthesizers being operable to generate a first local oscillating signal in response to a first synthesizer control signal, and a second one of the plurality of synthesizers being operable to generate a second local oscillating signal in response to a second synthesizer control signal; and
  a plurality of receive chains being operable to receive signals from at least one of a serving base station and a plurality of neighbor base stations, to process the received signals and to output the processed received signals, a first subset of the plurality of receive chains receiving the first local oscillating signal from the first synthesizer in both a first mode of operation and a second mode of operation, a second subset of the plurality of receive chains receiving the first local oscillating signal from the first synthesizer in the first mode of operation according to one or more synthesizer control signals received from a baseband subsystem, and the second subset of receive chains receiving a local oscillating signal from another one of the plurality of synthesizers in the second mode of operation according to the one or more synthesizer control signals received from the baseband subsystem.

8. The transceiver subsystem of claim 7, wherein the first subset of receive chains is dedicated to receiving the signals from the serving base station in both the first and second modes of operation, wherein the second subset of receive chains receives the signals from the serving base station in the first mode of operation and receives the signals from at least one of the neighbor base stations in the second mode of operation.

9. The transceiver subsystem of claim 7, wherein the first mode of operation is a multiple input multiple output mode of operation and the second mode of operation is a non-multiple input multiple output mode of operation.

10. The transceiver subsystem of claim 7, wherein:
  the plurality of synthesizers includes a third synthesizer operable to generate a third local oscillating signal in response to a third synthesizer control signal; and
  the second subset of receive chains includes a first receiver and a second receiver, the first receiver receiving the second local oscillating signal from the second synthesizer in the second mode of operation, and the second receiver receiving the third local oscillating signal from the third synthesizer in the second mode of operation.

11. The transceiver subsystem of claim 10, wherein the first and second receivers of the second subset of receive chains are dynamically allocated to tune to different ones of the neighbor base stations in the second mode of operation.

12. A wireless communication network, comprising:
  a plurality of base stations arranged in a cellular configuration; and
  a mobile station including:
  a baseband subsystem including a controller and a signal processing unit operatively connected to the controller, the baseband subsystem being operable to generate one or more synthesizer control signals; and
  a radio frequency subsystem operatively connected to the baseband subsystem, the radio frequency subsystem including:
  a transmitter operable to obtain transmit signals from the baseband subsystem, process the transmit signals and to send out the processed transmit signals from the wireless mobile station;
  a plurality of synthesizers, a first one of the plurality of synthesizers being operable to generate a first local oscillating signal and a second one of the plurality of synthesizers being operable to generate a second local oscillating signal;
  a plurality of radio frequency receive chains operable to receive signals from at least one of the plurality of base stations, to process the received signals and to send the processed received signals to the baseband subsystem, a first one of the plurality of radio frequency receive chains receiving the first local oscillating signal from the first synthesizer in a first mode of operation to tune to a serving base station according to the one or more synthesizer control signals, the first radio frequency receive chain receiving the second local oscillating signal from the second synthesizer in a second mode of operation to tune to a neighbor base station according to the one or more synthesizer control signals, and a second one of the plurality of radio frequency receive chains receiving the first local oscillating signal from the first synthesizer in both the first and second modes of operation to tune to the serving base station;
  wherein there is no transmission gap from the serving base station during the second mode of operation.

* * * * *